US008693886B2

(12) United States Patent
Kikuchi

(10) Patent No.: US 8,693,886 B2
(45) Date of Patent: Apr. 8, 2014

(54) OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 101 days.

(21) Appl. No.: 13/520,730

(22) PCT Filed: Jan. 7, 2010

(86) PCT No.: PCT/JP2010/050096

§ 371 (c)(1),
(2), (4) Date: Jul. 5, 2012

(87) PCT Pub. No.: WO2011/083575

PCT Pub. Date: Jul. 14, 2011

(65) Prior Publication Data

US 2012/0281988 A1    Nov. 8, 2012

(51) Int. Cl.
*H04B 10/00* (2013.01)
*H04B 10/12* (2011.01)
*H04B 10/06* (2011.01)

(52) U.S. Cl.
USPC ........... 398/159; 398/152; 398/147; 398/156; 398/202; 398/208

(58) Field of Classification Search
USPC .......... 398/159, 152, 156, 147, 182–185, 398/201–202, 214, 208
See application file for complete search history.

(56) References Cited

U.S. PATENT DOCUMENTS

| 7,023,601 B2 * | 4/2006 | McGhan et al. ............ 359/246 |
| 8,041,232 B2 | 10/2011 | Tanaka et al. |
| 8,184,992 B2 * | 5/2012 | Kikuchi ................... 398/202 |
| 2009/0074425 A1 * | 3/2009 | Tanaka et al. ............. 398/185 |

(Continued)

FOREIGN PATENT DOCUMENTS

| JP | 2009-60555 A | 3/2009 |
| WO | WO 2008/026326 A1 | 3/2008 |

(Continued)

OTHER PUBLICATIONS

Advanced Multi-level Transmission Systems Kenro Sekine, Nobuhiko Kikuchi, Kohei Mandai and Shinya Sasaki, OFC/NFOEC 2008.*

(Continued)

*Primary Examiner* — Ken Vanderpuye
*Assistant Examiner* — Abbas H Alagheband
(74) *Attorney, Agent, or Firm* — Crowell & Moring LLP

(57) ABSTRACT

In an optical multilevel transmitter (210), a polar representation of an optical multilevel signal (r, φ) is generated by a polar coordinate multilevel signal generation circuit (212), input to an optical amplitude modulator (211) and a polar coordinate type optical phase modulator (201), and output as an optical multilevel modulated signal (213). The polar coordinate type optical phase modulator (201) generates an optical phase rotation proportional to an input voltage, so the modulation distortion of the electric signal is transferred in a linear form to the optical phases of the optical multilevel modulated signal (213). In an optical multilevel receiver (219), a received signal is input to two sets of optical delay detectors (133) and balance receivers (134) and directly demodulated, and a differential phase Δφ for the received signal is calculated by arctangent computation from the output signal. In a phase adaptive equalizer (205), the modulation distortion of the phase is removed by adaptive equalization of the differential phase Δφ. By separately receiving the amplitude components and combining them, the modulation distortion is removed and highly sensitive optical multilevel transmission is achieved.

10 Claims, 15 Drawing Sheets

(56) References Cited

U.S. PATENT DOCUMENTS

| | | | |
|---|---|---|---|
| 2009/0208224 A1* | 8/2009 | Kikuchi | 398/141 |
| 2009/0238580 A1* | 9/2009 | Kikuchi | 398/192 |
| 2009/0324247 A1* | 12/2009 | Kikuchi | 398/159 |
| 2010/0021179 A1* | 1/2010 | Kikuchi | 398/183 |
| 2010/0239267 A1* | 9/2010 | Kikuchi | 398/156 |

FOREIGN PATENT DOCUMENTS

| | | | | |
|---|---|---|---|---|
| WO | WO 2008026326 A1 * | 3/2008 | | H04B 10/04 |
| WO | WO 2008/038337 A1 | 4/2008 | | |
| WO | WO 2008038337 A1 * | 4/2008 | | H04B 10/04 |
| WO | WO 2009/060920 A1 | 5/2009 | | |
| WO | WO 2009060920 A1 * | 5/2009 | | H04B 10/06 |

OTHER PUBLICATIONS

Highly Sensitive Optical Multilevel Transmission of Arbitrary Quadrature-Amplitude Modulation (QAM) Signals With Direct Detection Nobuhiko Kikuchi, Member, IEEE, and Shinya Sasaki, Senior Member, IEEE, Journal of Lightwave Technology, vol. 28, No. 1, Jan. 1, 2010.*

Phase Estimation Methods for Optical Coherent Detection Using Digital Signal Processing; Michael G. Taylor, Member, IEEE Journal of Lightwave Technology, vol. 27, No. 7, Apr. 1, 2009.*

Proposal and feasibility study of a 6-level PSK modulation format based system for 100-Gb/s migration; Kiyoshi Fukuchi; OFC/NFOEC 2008.*

English translation of International Preliminary Report on Patentability (eight (8) pages).

R. A. Griffin et al., "10 Gb/s Optical Differential Quadrature Phase Shift Key (DQPSK) Transmission Using GaAs/AlGaAs Integration", Optical Fiber Conference (OFC), 2002, (three (3) pages).

Nobuhiko Kikuchi et al., "First Experimental Demonstration of Single-Polarization 50-Gbit/s 32-Level (QASK and 8-DPSK) Incoherent Optical Multilevel Transmission", Proc. Optical Fiber Communication Conf., Anaheim, CA, Mar. 2007, (three (3) pages).

Jumpei Hongou et al., "1 Gsymbol/s, 64 QAM Coherent Optical Transmission Over 150 km with a Spectral Efficiency of 3 bit/s Hz", Proc. Optical Fiber Communication Conf., Anaheim, CA Mar. 2007, (three (3) pages).

M. G. Taylor, "Coherent Detection Method Using DSP to Demodulate Signal and for Subsequent Equalisation of Propagation Impairments", European Conference on Optical Communication, 2003, (two (2) pages).

Corresponding International Search Report with English translation dated Apr. 13, 2010 (four (4) pages).

Kiyoshi Fukuchi, "Proposal and Feasibility Study of a 6-level PSK Modulation Format Based System", IEICE Technical Report, The Institute of Electronics, Information and Communication Engineers, 2008 (twenty-one (21) pages).

Kenro Sekine, "Advanced Multi-level Transmission Systems", OFC/NFOEC, 2008, (three (3) pages).

Nobuhiko Kikuchi et al., "Highly-Sensitive Optical Multilevel Transmission with Direct Detection", IEICE Technical Report, The Institute of Electronics, Information and Communication Enginners, 2009 (twenty-three, (23) pages).

Michael G. Taylor , "Phase Estimation Methods for Optical Coherent Detection Using Digital Signal Processing", Journal of Lightwave Technology, vol. 27, No. 7, 2009, (fourteen (14) pages).

* cited by examiner (A) Definition of amplitude r(n) and phase φ(n)

(B) Quarternary Phase Shift Keying (QPSK)

(c) 16-level Quarternary Amplitude Modulation (16QAM)

(d) 16-level Amplitude and Phase Modulation (16APSK)

(A) Complex multilevel signal (B) Electric field of output optical signal 109

(C) Input signal of adaptive equalizer circuit 115

(D) Output signal of adaptive equalizer circuit 115

(A) Complex multilevel signal (B) Electric field of output optical signal 109

(C) Input signal of multilevel decision circuit 117 without adaptive equalizer circuit 115-1

(D) Input signal of multilevel decision circuit 117 with adaptive equalizer circuit 115-1

(E) Example of phase transition of output signal 101

(A) Time-dependent transition of the phase modulation signal 203 of this invention (B) Transition of the phase modulation signal 203 of this invention on the complex plane (C) Differential phase $\Delta\phi$ output from the inverse-tangential calculation circuit 137

(A) complex multilevel signal (B) Transition of phase modulation signal 203 of the invention (1 Sample/symbol)

(C) Input signal of multilevel decision circuit 215 of this invention without adaptive equalizer circuit 205

(D) Input signal of multilevel decision circuit 215 of this invention with adaptive equalizer circuit 205

(A) Binary amplitude- and phase-modulation (B) Eight level amplitude- and phase-modulation (C) Example of binary coupled amplitude- and phase- modulation -1

(D) Example of binary coupled amplitude- and phase- modulation -2

(E) Output optical signal 227 in the MZ modulator in Fig. D (F) Output optical signal 222 from the MZ modulator in Fig. D (A) Time-dependent transition of the multilevel modulation signal 213 of this invention and polar-coordinate based signal interpolation (B) Transition of multilevel modulation signal 213 of this invention (C) Transition of differential phase

OPTICAL TRANSMISSION SYSTEM

TECHNICAL FIELD

The present invention relates to an optical transmission system, particularly to an optical transmission system that reduces an optical waveform distortion in an optical information transmission technology, and more particularly to an optical transmitter and receiver, and an optical transmission system, which are suitable for transmission and reception of an optical multilevel information transmitted through an optical fiber.

BACKGROUND ART

The amount of information (transmission capacity) transmittable through one optical fiber reaches a limit because a wavelength bandwidth of an optical fiber amplifier has been substantially used up due to an increase in the number of wavelength channels and an increase in a modulation speed of an optical signal. Further, in order to increase the transmission capacity of the optical fiber, there is a need to devise a signal modulation format, crow a large number of optical signals into a limited frequency range, and enhance the use efficiency of the frequency range.

In the world of a radio communication, a multilevel modulation technology has enabled such a high-efficient transmission that the frequency use efficiency exceeds 10 from the 1960's. The multilevel modulation has been also desired in the optical fiber transmission, and frequently studied up to now.

For example, in R. A. Griffin, et al., "10 Gb/s Optical Differential Quadrature Phase Shift Key (DQPSK) Transmission using GaAs/AlGaAs Integration," OFC2002, paper PD-FD6, 2002 (Non Patent Literature 1), quadrature phase shift keying (QPSK) that conducts quaternary phase shift keying has been reported. In N. Kikuchi, K. Mandai, K. Sekine and S. Sasaki, "First experimental demonstration of single-polarization 50-Gbit/s 32-level (QASK and 8-DPSK) incoherent optical multilevel transmission," in Proc. Optical Fiber Communication Conf. (OFC/NFOEC), Anaheim, Calif., March 2007, PDP21. (Non Patent Literature 2), a 32-level amplitude and phase modulation of a quaternary amplitude modulation and an eight-level phase modulation are combined together has been reported.

FIGS. 1(A) to 1(D) are diagrams illustrating a complex phase plane used for the optical transmission, and signal constellations of various known modulation formats. Signal points of various optical multilevel signals (complex indication of optical field at identification time) are plotted on the complex phase plane (or complex plane, phaser plane, IQ plane).

FIG. 1(A) is an illustrative view of the signal points on the IQ plane, and the respective signal points can be indicated by complex Cartesian coordinates (IQ coordinates) or polar coordinates represented by an amplitude r(n) and a phase φ(n) illustrated in the figure.

FIG. 1(B) illustrates a quaternary phase shift keying (QPSK) that transmits 2-bit information (00, 01, 11, 10) by one symbol with the aid of four values (π/4, 3π/4, −3π/4, −π/4) as a phaser angle φ(n).

FIG. 1(C) illustrates a 16-value quadrature amplitude modulation (16QAM) widely used by radio. In the 16QAM, the signal points are arranged in a grid-like pattern, and information transmission of 4 bits per one symbol is enabled. In an example illustrated in the figure, two values of higher-order bits (10xx, 11xx, 01xx, 00xx) are expressed by Q-axial coordinates, and two values of lower-order bits (xx10, xx11, xx01, xx00) are expressed by I-axial coordinates. There has been known that the signal constellation has a high receiver sensitivity because a distance between the respective signal points can be increased, and there has been reported that the quadrature amplitude modulation of this type can be realized by the aid of a coherent optical receiver. For example, in J. Hongou, K. Kasai, M. Yoshida and M. Nakazawa, "1 Gsymbol/s, 64 QAM Coherent Optical Transmission over 150 km with a Spectral Efficiency of 3 Bit/s/Hz," in Proc. Optical Fiber Communication Conf. (OFC/NFOFEC), Anaheim, Calif., March 2007, paper OMP3. (Non Patent Literature 3), there has been reported an experimental example of transmission and reception of a 64QAM signal. The coherent receiver is of a system using a local laser source arranged in the interior of a receiver for detecting the phaser angle of the optical signal.

Now, a description will be given of a coherent receiving system that is one of the conventional optical multilevel receivers, for example, a coherent optical field receiver that has been reported in M. G. Taylor, "Coherent detection method using DSP to demodulate signal and for subsequent equalization of propagation impairments," paper We4.P.111, ECOC 2003, 2003 (Non-Patent Literature 4).

FIG. 2 is a configuration diagram of a conventional digital coherent optical multilevel transmission system using a polarization diversity coherent optical field receiver.

In an optical multilevel transmitter 100, an unmodulated laser beam output from a laser source 106 is input to a quadrature optical field modulator 107, and an output optical signal 109 that has been subjected to a given field modulation is output from an output optical fiber 108. An information signal to be transmitted is input to a digital information input terminal 101 as a parallel (for example, m bit width) binary high-speed digital electrical signal string. The signals are converted into a complex multilevel information signal 103 cohered every several bits by a complex multilevel signal generator circuit 102. The signal is a digital electric multilevel signal expressed by (i(n), q(n)) (n is a sample number) on a two-dimensional IQ plane, and a real part i and an imaginary part q thereof are output every time interval T (=symbol time). After those signals have been converted into high-speed analog signals by DA converters 104-1 and 104-2, the signals are amplified by driver circuits 105-1 and 105-2, and input to two modulation terminals I and Q of the quadrature optical field modulator 107. As a result, the output optical signal 109 becomes an optical field signal of a complex multilevel signal (i, q) having an in-phase component I and a quadrature-phase component Q of the optical field. An optical field of the optical amplitude and phase modulation signal is (i(n)+jq(n)) exp(jω(n)), and ω(n) is an optical angular frequency of the laser source 106. In this example, the DA converters 104 are used for multilevel modulation. However, if the number of multilevel is small, for example, if quaternary phase shift keying is realized, two pairs of binary signals may be applied to the quadrature optical field modulator without using the DA modulator.

After the output optical signal 109 has been transmitted through an optical fiber transmission channel 122, and undergone transmission degradation due to chromatic dispersion of the optical fiber, the output optical signal 109 is input to a digital coherent optical receiver 120. An input optical signal 121 is split into four types of an in-phase component of a horizontal (S) polarization, a quadrature-phase component of the horizontal polarization, and the in-phase component and the quadrature-phase component of a vertical (P) polarization by a polarization-diversity optical 90-deg. hybrid circuit 113, which are input to balanced optical receivers 110-1, 110-2, 110-3, and 110-4, respectively. A local laser source 112 arranged within the receiver is used as a reference of the optical phase of the received light, and has the substantially same wavelength as that of the input optical signal 121. An output light of the local laser source 112 is connected to another input port of the polarization-diversity optical 90-deg. hybrid circuit 113, and distributed to the balanced optical receivers 110-1, 110-2, 110-3, and 110-4 as with the signal light. In the respective balanced optical receivers, the input signal lights interfere with the local light so as to be converted into electrical signals, and then subjected to time sampling and converted into digital signals by respective AD converters 111-1, 111-2, 111-3, and 111-4. Those digital signals are first input to chromatic dispersion compensator circuits 114-1 and 114-2 for each polarization component, then input to an adaptive equalizer circuit 115. After the digital signals have been subjected to compensation for modulation distortion, waveform distortion caused by the remaining chromatic dispersion, and change and polarization dispersion of a polarization state, the digital signals are input to a downstream phase estimation circuit 116. Two sets of multilevel signals from which phase fluctuation has been removed are input to a multilevel signal decision circuit 117 in which the multilevel signals are subjected to symbol decision processing, and then decoded to original bit strings.

The above multilevel transmission suffers from a serious problem such as a modulation distortion of the generated optical multilevel signal. FIG. 3 is an illustrative view of a problem to be solved by the present invention, and illustrates the modulation distortion and an appearance of the equalization of the modulation distortion in the conventional digital coherent optical multilevel transmission system. The multilevel signal output from the complex multilevel signal generator circuit 102 is an ideal multilevel signal described in digital information. For example, in an example of the quaternary phase shift keying, the complex signal constellation is represented as illustrated in FIG. 3(A), and an error and a distortion are not included at positions of the signal points at all. However, in a process where the multilevel signals are converted into the high-speed analog signals, and converted into the optical signals by the DA converters 104-1 and 104-2, the multilevel signals suffer from large waveform degradation. As its factors, for example, there are shortage of a modulation bandwidth in the DA converters 104, the driver circuits, and the quadrature optical field modulator 107, reflection of a high-frequency signal in connectors and the respective components arranged in the channels, and differences of timing among plural modulation signals during modulation. If there are those degradation factors, the optical field of the output signal 101 causes an error at the signal point position as illustrated in FIG. 3(B), which causes a large degradation of a code error rate of the received signal.

However, because the digital coherent optical receiver 120 according to this example can take the optical field of the optical signal within the receiver as it is, the internal adaptive equalizer circuit 115 can be used to compensate a part of the modulation distortion. FIG. 3(C) illustrates a signal constellation to be input to the adaptive equalizer circuit 115, which is substantially identical with that of the output optical signal 109 (in this example, for simplification, influences of the chromatic dispersion, the fluctuation of polarization, and the phase fluctuation are ignored). If the modulation distortion caused on a transmitter side is linear, and a channel response time is finite, this waveform distortion can be substantially completely equalized by the aid of a digital adaptive equalizer filter such as a multistage transversal filter as the adaptive equalizer circuit 115. As a result, as illustrated in FIG. 3(D), the modulation distortion can be substantially completely removed from the output signal point, thereby making it possible to prevent the deterioration of the transmission characteristic such as the code error rate.

On the other hand, FIG. 4 is a configuration diagram of a phase pre-integration type optical multilevel signal transmission system using direct optical detection that has been proposed by the present inventors in advance. This system easily realizes the optical multilevel transmission by the aid of optical delay detection without using the coherent detection and the local laser source, and a detail of the system is disclosed in Patent Literature 1: WO2009/060920.

A basic configuration (the laser source 106, the quadrature optical field modulator 107, the complex multilevel signal generator circuit 102, the DA converters 104, the driver circuits 105, etc.) of a phase pre-integration type optical field transmitter 123 is roughly identical with the optical multilevel transmitter 100 in FIG. 2. However, because the direct optical detection is used, a part of the internal signal processing is different. In this example, the multilevel signals output from the complex multilevel signal generator circuit 102 are input to a phase pre-integration circuit 126, and converted into phase pre-integration complex multilevel information signals in which only phase components are digitally integrated at a time interval T within the phase pre-integration circuit 126. When the complex multilevel information signals (i, q) to be input are converted into the polar coordinates on the complex plane, the polar coordinates can be described, for example, as $Ei(n)=i(n)+jq(n)=r(n)\exp(j\phi(n))$ (j is an imaginary unit). In this expression, n is a symbol number of the digital signal, $r(n)$ is a symbol amplitude of the digital signal, and $\phi(n)$ is a phaser angle. In this case, the phase pre-integration signals to be output can be also described as $Eo(n)=i'(n)+jq'(n)=r(n)\exp(j\theta(n))=r(n)\exp(j\Sigma\phi(n))$ in the polar coordinates. In this expression, $\theta(n)$ is a phaser angle of the output signal, $\Sigma\phi(n)$ is a value obtained by accumulating past phaser angles $\phi(1) \ldots \phi(n)$. After the output signals have been again converted into the Cartesian coordinates, the output signals are input to a complex up-sampling circuit 124, and sampling points are complemented so that a sampling speed becomes 2 samples/symbol or more. As a result, the Nyguist theorem is satisfied to enable complete field equalization processing. Thereafter, an inverse function of the degradation caused by the optical fiber transmission channel 122 is applied to the signals, and converted into complex signals i" and q" by a preequalizer circuit 125. After those signals have been converted into the high-speed analog signals by the DA converters 104-1 and 104-2 as with the optical multilevel transmitter in FIG. 2, the signals are converted into optical field signals $(i"(n)+jq"(n))\exp(j\omega(n))$ by the quadrature optical field modulator 107, and output.

After the output optical signal 109 has been transmitted through the optical fiber transmission channel 122, and undergone the transmission degradation due to the chromatic dispersion of the optical fiber, the output optical signal 109 is input to an incoherent optical multilevel receiver 130 as the input optical signal 121. An influence of the chromatic dispersion in the optical fiber transmission channel is mutually canceled by the inverse function applied by the preequalizer circuit 125 in advance, and therefore the input optical signal 121 is equivalent to the output signal of the phase pre-integration circuit 126.

The input optical signal 121 is split to three optical signal channels by an optical splitter 132, and input to a first optical delay detector 133-1, a second optical delay detector 133-2, and an optical intensity receiver 135. The first optical delay detector 133-1 is set so that a delay time difference Td between two internal optical channels becomes substantially equal to the symbol time T of the received optical multilevel information signal, and an optical phase difference between both the channels becomes 0. Also, the second optical delay detector 133-2 is set so that the delay time difference Td between those two internal optical channels becomes substantially equal to T, and the optical phase difference between both the channels becomes π/2. The output optical signals of the first and second optical delay detectors 133-1 and 133-2 are converted into electrical signals by balanced optical receivers 134-1 and 134-2, and thereafter converted into digital signals dI(n) and dQ(n) by AD converters 136-1 and 136-2, respectively. Also, an output electrical signal of the optical intensity receiver 135 is also converted into a digital signal P(n) by an AD converter 136-3.

Then, after the digital signals dI(n) and dQ(n) have been input to the adaptive equalizer circuit 115-1, and a part of the waveform distortion has been removed from the digital signals, the digital signals dI(n) and dQ(n) are input to an inverse tangential operation circuit 137. In this circuit, an inverse tangential operation of second argument having dI(n) as an X component and dQ(n) as a Y component is conducted to calculate the phaser angle. When the optical field of the input optical signal 121 is described as $r(n)\exp(j\theta(n))$, dI and dQ are written as $dI=r(n)r(n-1)\cos(\Delta\theta(n))$ and $dQ=r(n)\sin(\Delta\theta(n))$ from the principle of the optical delay detection. In this example, $\Delta\theta(n)$ is a phase difference $(\theta(n)-\theta(n-1))$ of a received n-th optical field symbol from a prior symbol. Because dI and dQ are a sine component and a cosine component of $\Delta\theta(n)$, respectively, the inverse tangential operation circuit 137 can conduct the inverse tangential (inverse Tan) operation of four quadrants to calculate $\Delta\theta(n)$.

In this configuration, because the phase pre-integration is conducted on the transmitter side, the phaser angle of the received optical field signal is $\theta(n)=\Sigma\phi(n)$. Hence, the output signal of the inverse tangential operation circuit 137 becomes $\Delta\theta(n)=Z\phi(n)-\Sigma\phi(n-1)=\phi(n)$, and a phase component $\phi(t)$ of the original complex multilevel information signal 103 can be extracted.

On the other hand, after a part of the waveform distortion has been removed from the output signal P of the optical intensity detector by the adaptive equalizer circuit 115-2, the output signal P is input to a square root circuit 138 so as to obtain an original field amplitude $r(n)=\sqrt{P(n)}$ as an output. Hence, the amplitude component r(n) and the phase component p (n) thus obtained are input to a Cartesian coordinate converter circuit 139 so as to reproduce an original digital electric multilevel signal $(I, Q)=r(n)\exp(\Delta\theta(n))$. The original digital electric multilevel signal is input to the multilevel signal decision circuit 117 to reproduce the information signal.

RELATED ART DOCUMENTS

Patent Literature

Patent Literature 1: WO2009/060920
Patent Literature 2: WO2008/026326
Patent Literature 3: U.S. Pat. No. 7,023,601

Non Patent Literature

Non Patent Literature 1: R. A. Griffin, et al., "10 Gb/s Optical Differential Quadrature Phase Shift Key (DQPSK) Transmission using GaAs/AlGaAs Integration," OFC2002, paper PD-FD6, 2002

Non Patent Literature 2: N. Kikuchi, K. Mandai, K. Sekine and S. Sasaki, "First experimental demonstration of single-polarization 50-Gbit/s 32-level (QASK and 8-DPSK) incoherent optical multilevel transmission," in Proc. Optical Fiber Communication Conf. (OFC/NFOEC), Anaheim, Calif., March 2007, PDP21

Non Patent Literature 3: J. Hongou, K. Kasai, M. Yoshida and M. Nakazawa, "1 Gsymbol/s, 64 QAM Coherent Optical Transmission over 150 km with a Spectral Efficiency of 3 Bit/s/Hz," in Proc. Optical Fiber Communication Conf. (OFC/NFOFEC), Anaheim, Calif., March 2007, paper OMP3

Non Patent Literature 4: M. G. Taylor, "Coherent detection method using DSP to demodulate signal and for subsequent equalization of propagation impairments," paper We4.P.111, ECOC 2003, 2003

SUMMARY OF INVENTION

Problems to be Solved

One of problems to be solved by the present invention resides in that in the conventional optical multilevel transmission system of the direct detection, the modulation distortion caused by incompleteness of the optical modulation on the transmitter side in the optical multilevel receiver cannot be completely equalized. That is, in the above-mentioned optical multilevel transmission system using the direct detection illustrated in FIG. 4, because a restoring process of the optical multilevel signal in the interior of the optical multilevel receiver is nonlinear, the linear distortion occurring in the Cartesian modulation of the field in the interior of the transmitter cannot be linearly equalized. As the factors of the above non-linearity, there are, for example, the optical delay detection reception and the extraction of the phase difference component by the optical delay detectors 133 and the balanced optical receivers 134, and the use of the inverse tangential operation circuit 137 and the square root circuit 138. The adaptive equalizer circuits 115-1 and 115-2 are arranged in the interior of the incoherent optical receiver of FIG. 4. However, only a part of the distortion of the received waveform can be compensated by the linear transversal filters generally used as those adaptive equalizer circuits. For example, the adaptive equalizer circuits 115-1 and 115-2 can equalize the incompleteness of the frequency characteristic of the receiver, the reflection of the high-frequency signal in the interior of the receiver, the displacement of the origin in the signal constellation, and the amplitude error. However, in principle, the adaptive equalizer circuits 115-1 and 115-2 cannot equalize the modulation distortion that is the waveform distortion caused by the linear degradation in the interior of the optical transmitter.

FIG. 5 illustrates the results obtained by performing numerical calculation on an appearance of the modulation and demodulation of the quaternary phase shift keying signal with the use of optical transmission simulation, which are an example of the modulation distortion and the results of the adaptive equalization on the receiver side in the conventional optical transmission system using the direct detection. FIG. 5(A) illustrates a signal constellation of an original multilevel signal generated in the complex multilevel signal generator circuit, and FIG. 5(B) illustrates a signal constellation of the output optical signal 109 that is the modulation distortion, which has been degraded by the shortage of the frequency characteristic in the interior of the transmitter, and the displacement of the modulation timing. This calculation example is an example of a simple quaternary phase shift keying, and does not use the phase pre-integration circuit 126, the preequalizer circuit 125, and the DA converters 104 illustrated in FIG. 4. FIGS. 5(C) and 5(D) illustrate signal constellations of the complex signal obtained by receiving and reproducing the quaternary phase shift keying signal having the modulation distortion by the incoherent optical multilevel receiver 130 of FIG. 4, and the modulation distortion is increased more than the output optical signal in FIG. 5(B) due to the influence of the optical delay detection. FIG. 5(C) illustrates a case without using the adaptive equalizer circuit 115, and FIG. 5(D) illustrates a case with using the adaptive equalizer circuit 115. In those cases, only a small effect of the adaptive equalization is obtained, and it is found that most of the modulation distortion remains.

When the modulation distortion thus remains, an inter-symbol distance of the received multilevel signal is reduced, and a resistance to the noise and the nonlinear effect is lost. This leads to a large degradation of the transmission characteristics such as the receiver sensitivity or the transmission distance. Further, because the shortest distance between the respective signal points is restricted, the number of signal points is difficult to increase, and an increase in the capacity due to an increase in the number of multilevel and a reduction in the signal bandwidth are also difficult.

A second problem to be solved by the present invention resides in the degradation of the performance caused by the displacement of timing of an electrical signal to be supplied and a difference in the frequency characteristic in the conventional optical multilevel modulator circuit using plural optical modulators with the direct detection. They have a possibility of having the variability when being mounted, and the amount thereof is also changed according to the aging degradation and a difference of the temperature characteristics. This makes difficult to set the difference to be completely zero on the transmitter side, resulting in a factor for inducing the degradation of the transmission characteristics.

The present invention has been made in view of the above, and one object of the present invention is to equalize the modulation distortion in the optical transmission system using the direct detection. Another object of the present invention is to prevent the degradation of the transmission characteristics to enhance the practicality of the optical transmission system.

Means to Solve the Problems

The above objects of the present invention can be achieved by the provision of an optical transmitter having a polar coordinate type optical phase modulator that modulates a phase of an optical signal in a phase rotation direction, and an optical receiver having a coupled two-dimensional optical delay detection receiver, at least two AD converters, a differential phase calculation circuit, and a digital adaptive equalizer, in which an optical phase multilevel modulation signal of a binary or more transmitted from the optical transmitter is received by the optical receiver, an output signal of the two-dimensional optical delay detector is converted into a high-speed digital signal by the AD converters, and input to the differential phase calculation circuit, and the calculated differential phase component is adaptively equalized by the digital adaptive equalizer, and decision processing is then conducted on the multilevel signal.

The above objects of the present invention can be achieved by the provision of an optical amplitude modulator that induces no phase inversion of the optical signal in the interior of the optical transmitter, and the provision of an optical intensity detector in the interior of the optical receiver in addition to the above configuration when the optical signal is subjected to amplitude modulation, in which the optical multilevel modulation signal in which both of the phase and the amplitude of the optical signal have been modulated is transmitted from the optical transmitter, an optical intensity modulation component obtained from the optical intensity modulator or an optical amplitude modulation component that is a square root of the optical intensity modulation component is synthesized with the differential phase component obtained from the optical receiver, and thereafter the multilevel signal is subjected to the decision processing.

In this situation, if a part of the optical amplitude modulation component is coupled with a part of an optical phase modulation component, and modulated by the same information signal, more complicated multilevel modulation such as QAM modulation is generated, and the present invention can be applied to the complicated multilevel modulation.

Also, if a Mach-Zehnder type optical modulator is used for the optical amplitude modulator, and the signal is modulated in a state where the modulation signal to be supplied to a modulation electrode of the Mach-Zehnder modulator is biased so as not to cross an extinction point that is a minimum point of the optical transmission characteristics, phase jump does not occur during the amplitude modulation. Therefore, the compensation of the modulation distortion according to the present invention can be effectively implemented.

Also, the present invention can be realized by realizing the phase modulator and the amplitude modulator by a two-electrode Mach-Zehnder type modulator, and by modulation so that a sum of voltages to be applied to two electrodes becomes the phase modulation component, a difference between the voltages to be applied to the two electrodes becomes the amplitude modulation component, and the difference between the applied voltages does not cross the extinction point of the Mach-Zehnder type optical amplitude modulator.

In the present invention, the number of optical phase modulators does not need to be limited to one, and plural polar coordinate phase modulators that modulate the phase of the optical signal into a rotating direction may be connected in cascade. Also, plural optical amplitude modulators that do not induce phase inversion, or plural polar coordinate phase modulators that modulate the phase of the optical signal into the rotating direction may be connected in cascade.

Further, the present invention can be realized by modulation by setting the phase modulation signal of the optical phase modulator to be a high-speed analog signal generated by the DA converter in which the sampling speed is larger than 1 sample/symbol, and by interpolating the phase and the amplitude of the signal points so that the phases of the generated signal are continuous if a phase modulation range exceeds π.

Further, the present invention can be realized by conducting unwrapping processing of the phase so that the sampling speed of the AD converter arranged within the receiver is larger than 1 sampling/symbol, and a range of the calculated differential phase modulation becomes continuous even if the range exceeds ±π (or 0 to 2π).

According to the first solving means of this invention, there is provided an optical transmission system, comprising:

an optical transmitter including a polar coordinate based optical phase modulator that modulates a phase of an optical signal into a phase rotation direction; and an optical receiver including a coupled two-dimensional optical delay detection receiver, at least two AD converters, a differential phase calculation circuit, and a digital adaptive equalizer, wherein binary or more level of optical phase multilevel modulation signal, which is transmitted from the optical transmitter, is received by the optical receiver, and two output signals of the coupled two-dimensional optical delay detection receiver are converted into respective high-speed digital signals by the AD converters and input to the differential phase calculation circuit, and the differential phase component calculated by the differential phase calculation circuit is adaptively equalized by the digital adaptive equalizer, and thereafter decision processing of the multilevel signal is conducted.

Advantages

According to the present invention, it is possible to equalize the modulation distortion in the optical transmission system using the direct detection. According to the present invention, it is possible to prevent the degradation of the transmission characteristics to enhance the practicality of the optical transmission system.

DESCRIPTION OF EMBODIMENTS

Hereinafter, several embodiments of the present invention will be described with reference to the drawings.

First Embodiment

Figure 6:
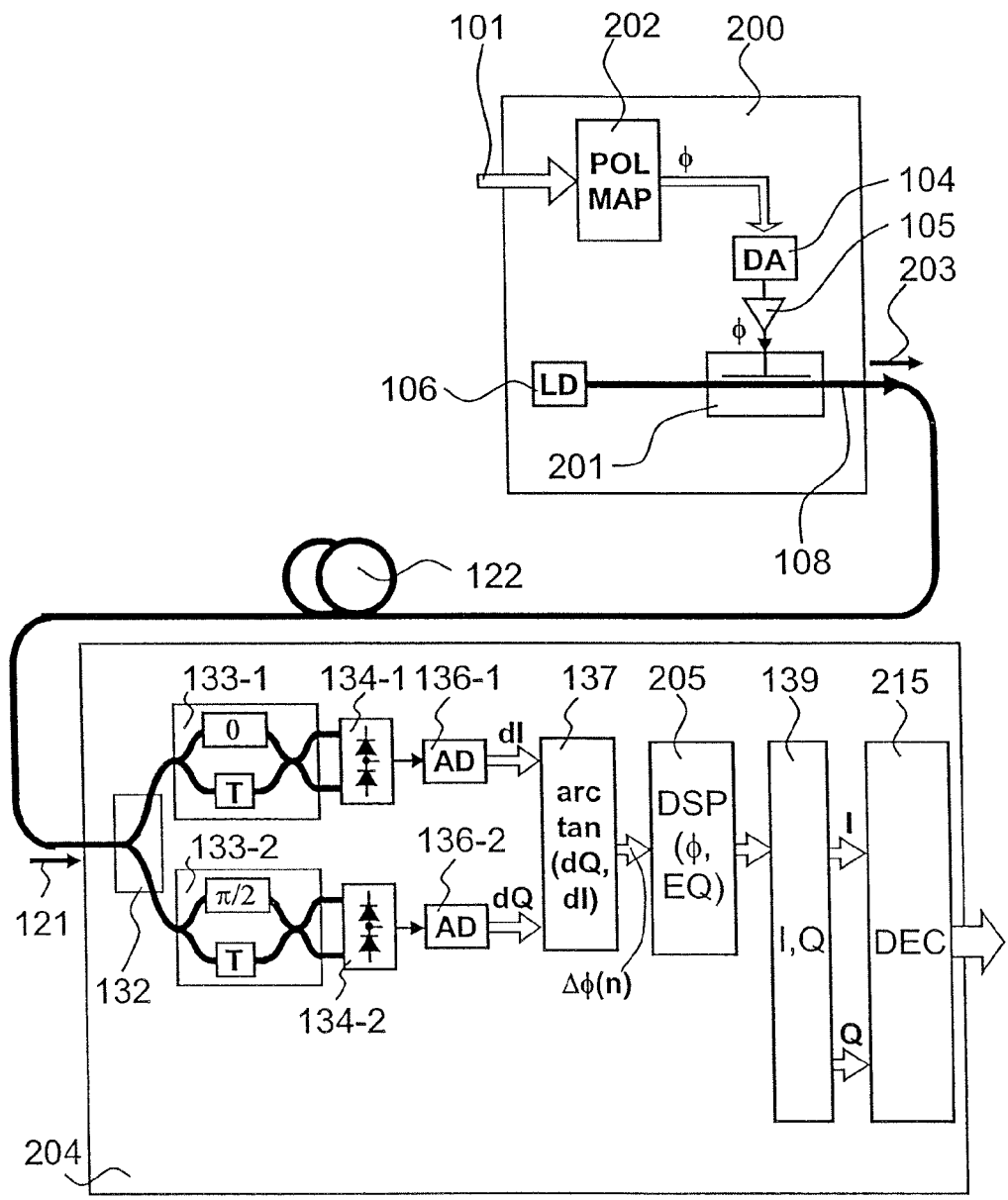
FIG. 6 is a configuration diagram of a direct detection optical multilevel transmission system using an optical multilevel phase modulation according to a first embodiment of this embodiment.

FIG. 6 is a configuration diagram of a direct detection optical multilevel transmission system using an optical multilevel phase modulation according to a first embodiment of the present invention.

Features of this configuration resides in that, for example, a pure multilevel phase modulation optical signal is generated by the aid of a polar coordinate based optical phase modulator on a transmitter side, and a differential phase component is extracted from a received signal, and adaptively equalized in a phase area to equalize a modulation distortion. Hereinafter, in this embodiment, a channel of an optical signal is indicated by a heavy line, a channel of a high-frequency signal of electricity is indicated by a thin line, and channels of parallel electric digital signals using plural signal lines are indicated by outline arrows.

This optical transmission system includes, for example, an optical phase multilevel transmitter (optical transmitter) 200, and an optical phase multilevel receiver (optical receiver) 204. The optical phase multilevel transmitter 200 includes a phase multilevel signal generator circuit 202, a DA converter 104, a driver circuit 105, a laser source 106, and a polar coordinate based optical phase modulator 201. The optical phase multilevel receiver 204 include an optical splitter 132, optical delay detectors (coupled two-dimensional optical delay detection receivers) 133, balanced optical receivers 134, AD converters 136, an inverse tangential operation circuit (differential phase calculation circuit) 137, a phase adaptive equalizer circuit (digital adaptive equalizer) 205, a Cartesian coordinate converter circuit 139, and a phase multilevel signal decision circuit 215.

In the optical phase multilevel transmitter (optical transmitter) 200 according to this embodiment, the phase multilevel signal generator circuit 202 receives parallel information signals of m bits (m is an integer of 2 or more) from a digital information input terminal 101, allocates the parallel information signals to signal points of multilevel electrical signals of M value (M is an integer of 2 or more), and outputs the multilevel electrical signals as digital parallel signals. After the signals have been converted into electric high-speed analog signals by the DA converter 104, each analog signal is amplified by the driver circuit 105. Then, the amplified signal is input to the polar coordinate based optical phase modulator 201 of this embodiment where an output optical signal of the laser source 106 is converted into a pure phase modulation optical signal.

The polar coordinate based optical phase modulator 201 used in this embodiment is a device having a characteristic for linearly changing the input high-speed electrical signal into a phase of the optical signal. The polar coordinate based optical phase modulator 201 can be realized by, for example, a lithium niobate substrate, or a wave guide device using an electro-optical effect of semiconductor, and has been widely put on the market as a phase modulator.

Figure 7:
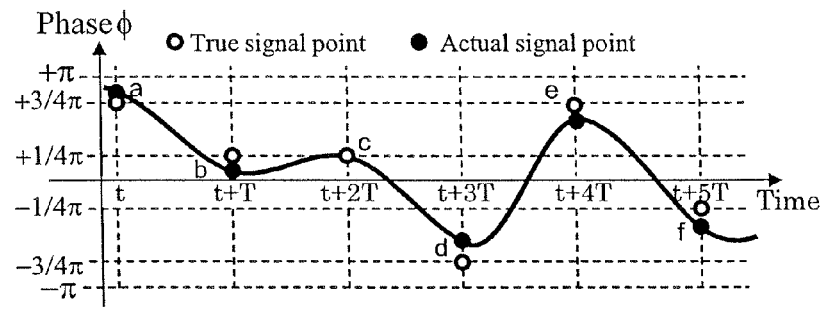
FIG. 7 is an illustrative view illustrating a phase transition of a phase modulation signal according to this embodiment, in the direct detection optical multilevel transmission system using the multilevel phase modulation according to this embodiment.
Figure 7:
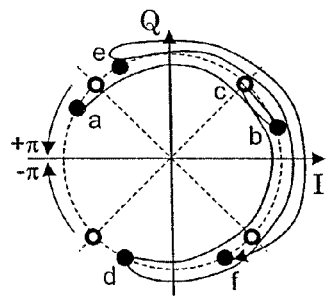
Figure 7:
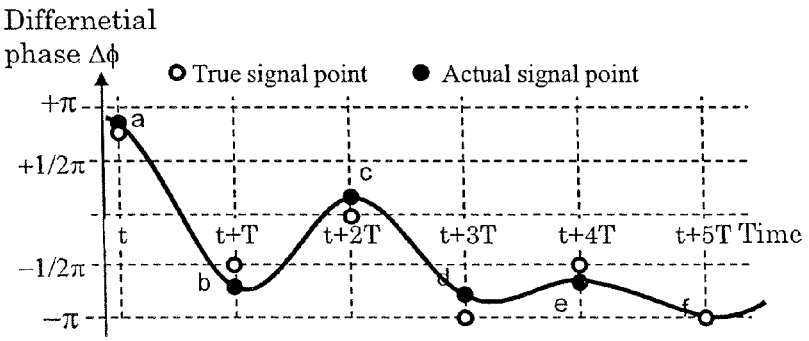

FIG. 7 illustrates an appearance of the phase modulation signal thus generated. FIG. 7(A) illustrates an example of a phase transition waveform of a phase modulation signal 203 according to this embodiment. This waveform is proportional to the high-speed electrical signal to be supplied to the polar coordinate based phase modulator 201 of this embodiment, and has such a feature that the waveform is continuously changed when conducting transition between the signal points. This example employs quaternary phase shift keying, and the phase modulation signal takes any discrete value of phases $3\pi/4$, $\pi/4$, $-\pi/4$, and $-3\pi/4$ at center times t, t+T, t+2T . . . of a multilevel symbol. In this example, true signal point positions are indicated by white circles a to f. However, in fact, because there is the modulation distortion of the high-speed signal, real signal point positions are slightly displaced from the true signal point positions as indicated by black circles. FIG. 7(B) illustrates a change in the signal points on a complex plane, and the polar coordinate phase modulator used in this embodiment has such a feature that a field of the optical signal always travels along the rotating direction (phase rotation direction) when transiting between the respective signal points a to f. For example, when transiting from the signal point d to the signal point e, the field of the optical signal does not transit linearly, but transits along the phase rotation direction as illustrated in FIG. 7(B).

That is, with the use of the polar coordinate based phase modulator having the above feature, the modulation distortion caused by the phase modulation of the optical multilevel signal is linearly converted into the modulation distortion of the phase component.

The phase modulator of binary can be also realized by even an optical phase modulator of a Mach-Zehnder (MZ) type. However, the optical phase modulator of the simple Mach-Zehnder (MZ) type is not the phase modulator of the polar coordinate type intended by this embodiment. That is, in the optical modulator of the MZ type, when the input electrical signal is supplied, a phase change of 0 or $\pi$ can be caused before and after an extinction point. However, this is because since the amplitude passes through the origin (amplitude zero) on the way to largely change, and the phase component is discontinuously instantaneously inverted, the above condition that "phase modulation is substantially proportional to the applied voltage" is not satisfied. Likewise, an IQ optical modulator with two optical phase modulators of the MZ type as plural nesting, the quaternary phase shift keying using this IQ optical modulator, and the optical field modulation are excluded from the scope of this embodiment. As a special case, there is a case in which the MZ modulator is used as the polar coordinate modulation. This will be described in detail later.

After the phase multilevel signal generated as described above has passed through an optical fiber transmission channel 122, the phase multilevel signal is received by the optical phase multilevel receiver 204 of this embodiment. This receiver is the optical multilevel receiver using the optical direct detection as in FIG. 4. In this example, because only reception of the phase multilevel signal is assumed, an optical intensity receiver 135 is not used. The largest difference between this configuration and the conventional optical multilevel receiver using the direct detection resides in that the phase adaptive equalizer circuit 205 is arranged immediately after the inverse tangential operation circuit 137, and a differential phase $\Delta\phi$ is adaptively compensated.

FIG. 7(C) illustrates an example of the differential phase calculated from FIG. 7(A), and the differential phase $\Delta\phi=\phi(n+1)-\phi(n)$ is a linear function of a phase component $\phi(n)$ of the input signal. Accordingly, if an arithmetic circuit that receives the phase component, adaptively equalizes the input phase component by the linear function such as a linear butterfly filter, and outputs the phase component as it is, as the phase adaptive equalizer circuit according to this embodiment, the distortion having the phase component can be completely compensated. That is, when the polar coordinate phase modulation is used for the transmitter as described above, the phase modulation distortion of the optical multilevel signal can be completely compensated. This is a compensation principle of the modulation distortion in this embodiment.

Figure 8:
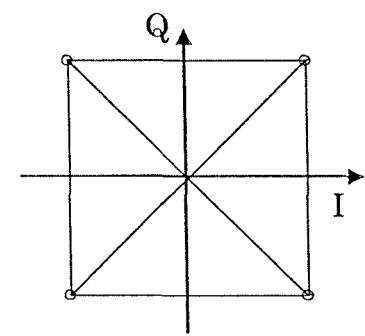
FIG. 8 is an illustrative view illustrating an appearance of equalization of the modulation distortion in the direct detection optical multilevel transmission system using the multilevel phase modulation according to this embodiment.
Figure 8:
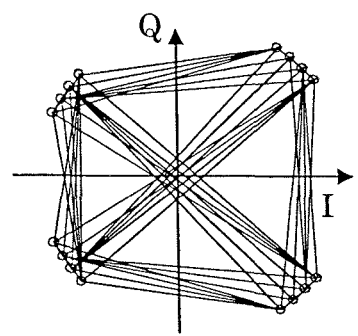
Figure 8:
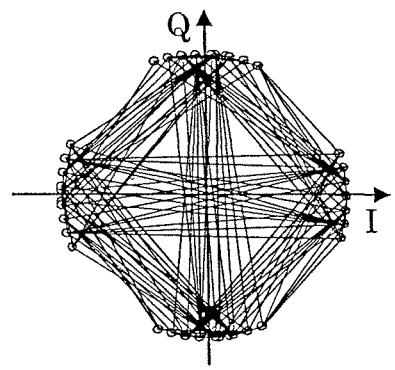
Figure 8:
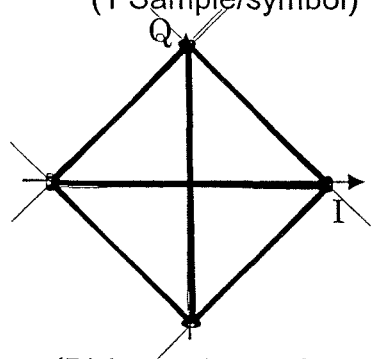

FIG. 8 illustrates a compensation effect of the modulation distortion in this embodiment. A signal point (A) of the original multilevel signal generated by the complex multilevel signal generator circuit 202 is largely degraded by the incompleteness of the frequency characteristic of the high frequency signal within the transmitter 200, and the signal constellation of the optical phase modulation signal 203 is largely disordered as illustrated in FIG. 8(B). FIGS. 8(C) and 8(D) illustrate the signal constellations of the complex signal obtained by receiving the quaternary phase shift keying signal having the modulation distortion by the optical phase multilevel receiver 204 of FIG. 6, and reproducing the detected differential phase component by the Cartesian coordinate converter circuit 139. In this example, because the amplitude detection receiver is not used, the amplitudes of the respective multilevel signals are a constant value (1). FIG. 8(C) illustrates a case in which there is no phase adaptive equalizer circuit 205, and FIG. 8(D) illustrates a case in which the phase adaptive equalizer circuit 205 is used, from which it is found that the modulation distortion is substantially completely equalized by this configuration.

Second Embodiment

Figure 9:
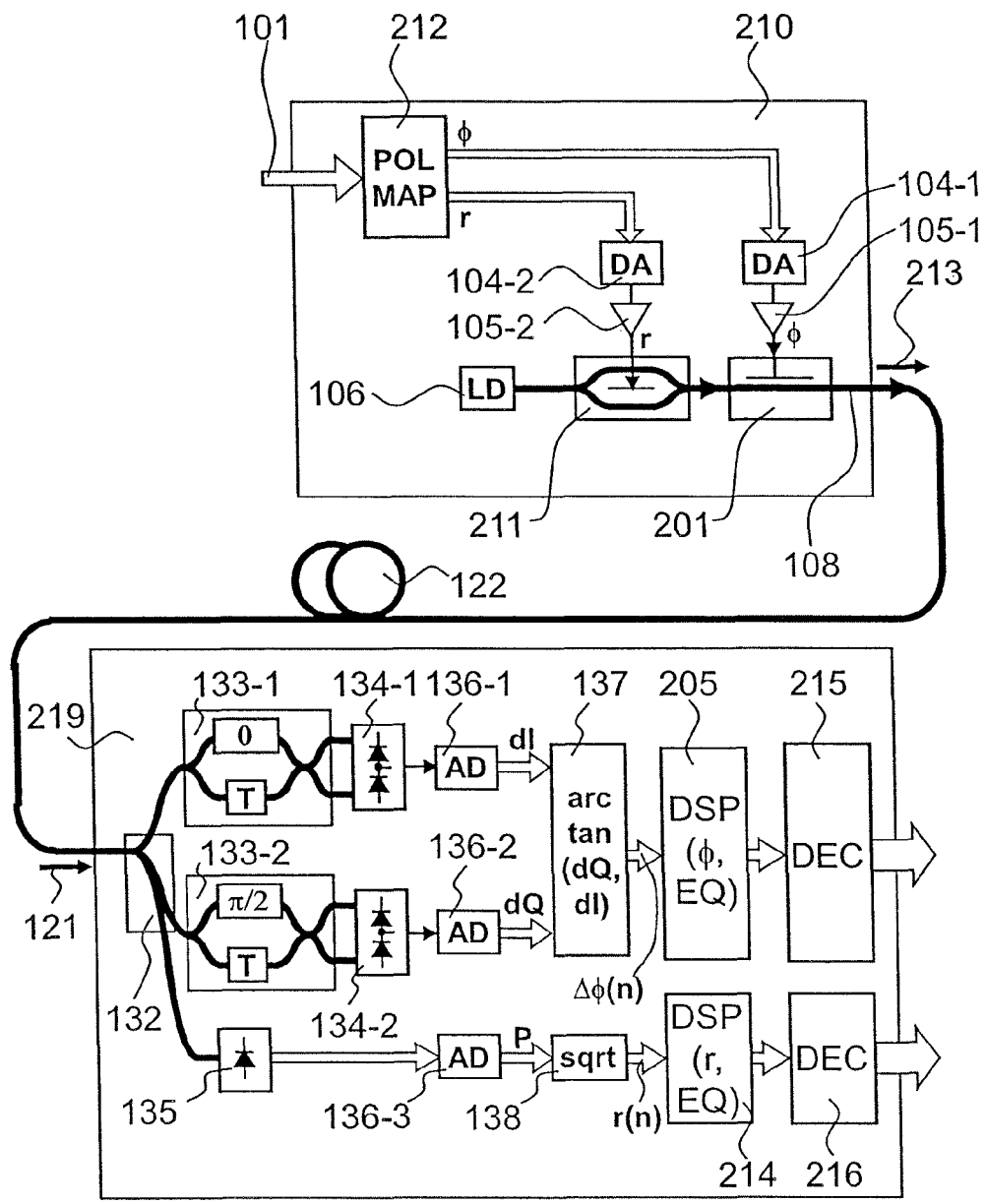
FIG. 9 is a configuration diagram of a direct detection optical multilevel transmission system using an optical multilevel amplitude and phase modulation according to a second embodiment of this embodiment.

FIG. 9 is a is a configuration diagram of a direct detection optical multilevel transmission system using an optical multilevel amplitude and phase modulation according to a second embodiment of the present invention.

The features of this configuration reside in that, for example, in addition to the phase modulation in the configuration of FIG. 6, an optical amplitude modulator 211 is introduced so as to modulate even the amplitude of optical signal, and an optical intensity receiver 135 is introduced so as to enable detection of the amplitude component to extend the configuration so that both of the amplitude and the phase can be used for information transmission. As an example of the multilevel amplitude and phase modulation that can be used with the above configuration, there is, for example, 16-level amplitude phase modulation of FIG. 1(D). This modulation can be generated by modulating the amplitude of the optical signal by binary, and modulating the phase by eight level, independently, on the transmitter side. Also, on the receiver side, this modulation can be decoded by receiving the amplitude component and the phase component (differential phase component), independently.

In an optical amplitude and phase multilevel transmitter 210 of the embodiment, complex multilevel signals represented by two-dimensional polar coordinates of amplitude information r and phase information $\phi$ is output by a polar coordinate multilevel signal generator circuit 212. Both of those information are converted into high-frequency electrical signals by DA converters 104-1 and 104-2, respectively, and then amplified by the driver circuits 105. Thereafter, the respective signals are input to the optical amplitude modulator 211 and the polar coordinate based optical phase modulator 201. Those two optical modulators are connected in cascade to the laser source 106. When the laser beam passes through the interiors of those optical modulators, the laser beam is subjected to the optical multilevel amplitude modulation and the optical multilevel phase modulation, and converted into an optical amplitude and phase modulation signal 213. When the optical amplitude modulator and the optical phase modulator are connected in cascade for use, the optical amplitude modulation component and the optical phase modulation component are supplied, independently. Therefore, no waveform interference of those components occurs, and the modulation distortion of the phase component and the modulation distortion of the amplitude component are transferred into the optical amplitude and phase modulation signal 213, independently.

Figure 10:
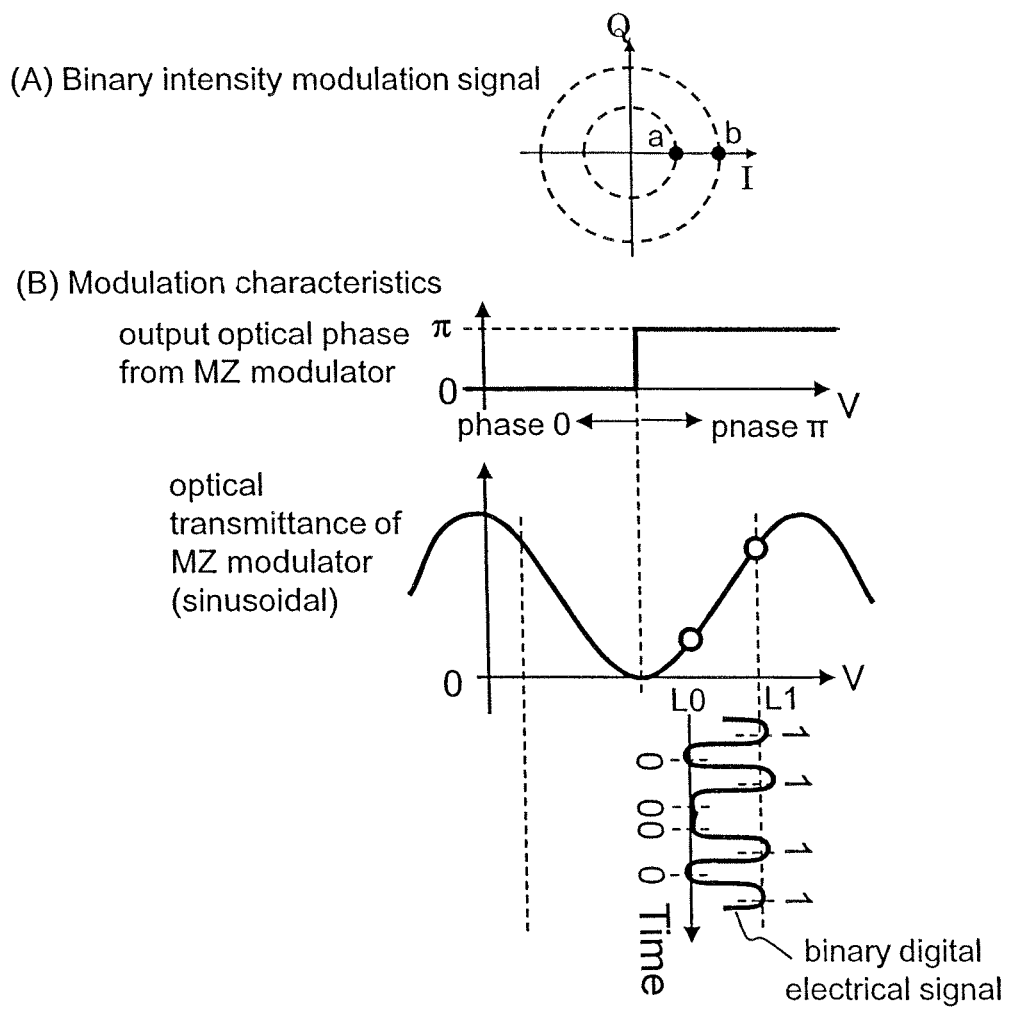
FIG. 10 is an illustrative view of a principle of an optical amplitude modulator according to the second embodiment of this embodiment.

FIG. 10 is an illustrative view of a principle of the optical amplitude modulator used in this configuration, which illustrates an example in which a chirpless MZ optical modulator is used for the optical amplitude modulator 211.

FIG. 10(A) illustrates a signal constellation of the optical signal caused by binary intensity modulation. In this example, because an amplitude value is binary of a and b (0<a<b) and chirpless, it is assumed that no change in the phase caused by the amplitude modulation occurs. In this modulation, for example, a binary electric digital signal of small amplitude, which has been modulated with the information signal as illustrated in FIG. 10(B) is supplied to the MZ optical modulator of X-cut. In this situation, an electrical signal level L0 of symbol 0 and an electrical signal level L1 of symbol 1 may fall on (does not cross the extinction point) a portion of a shoulder of the sinusoidal optical transmittance characteristic of the MZ modulator as illustrated in the figure. If L0 and L1 are sufficiently small, and sufficiently close to the extinction point of the optical transmittance characteristic (point of transmittance zero), because the conversion characteristic of the electrical signal and the optical field is substantially linear, the modulation distortion of the driving signal can be linearly converted into the optical amplitude change.

An appearance of the optical phase of the MZ modulator is illustrated in FIG. 10(B), and the optical phase is rapidly changed to 0 to $\pi$ with a boundary of the extinction point as described above. In this embodiment, when the MZ modulator is used for the amplitude modulation, it is desirable that this point is prevented so that the optical phase is not inverted to keep the linearity of the optical phase modulation.

Figure 4:
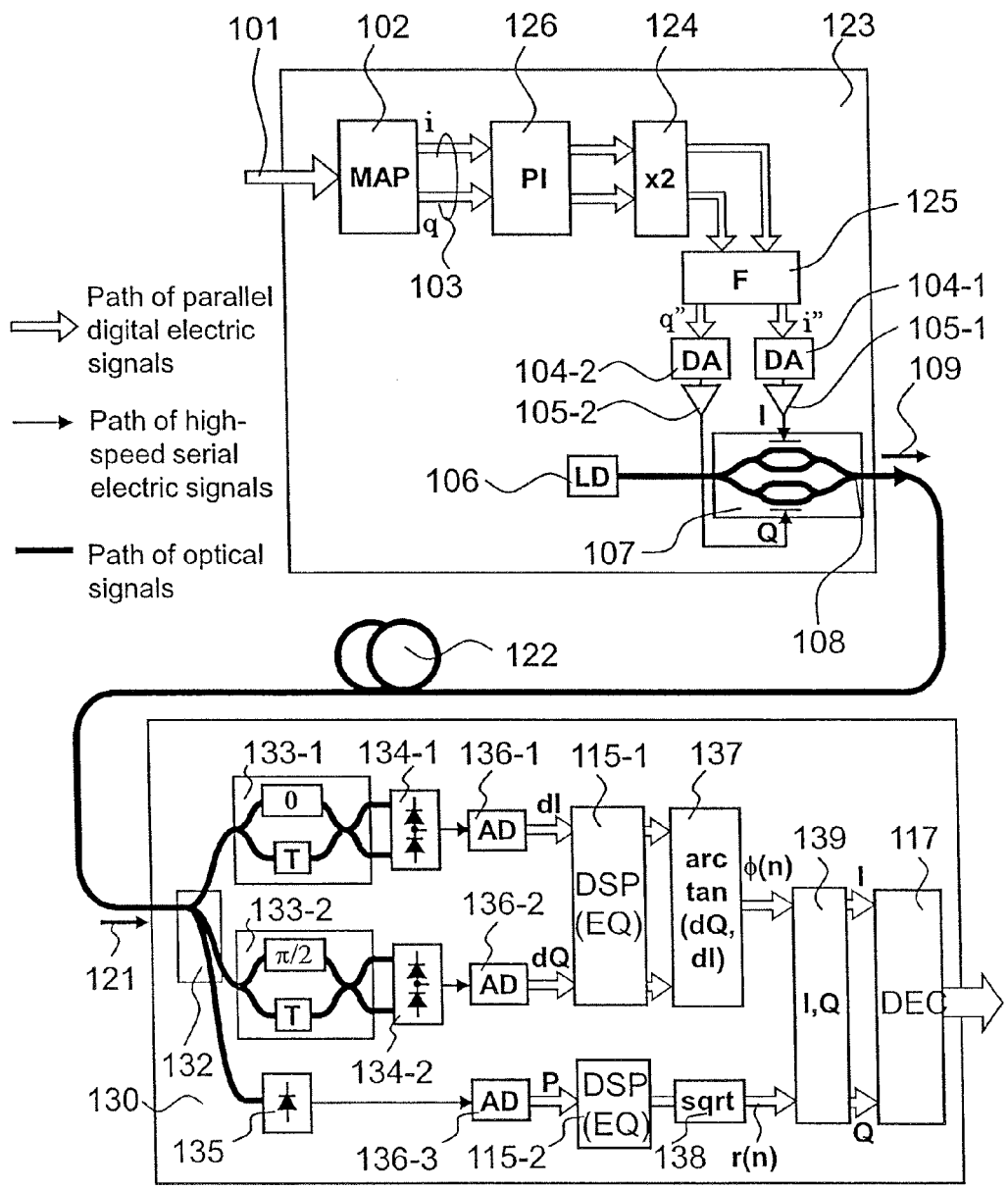
FIG. 4 is a configuration diagram of a conventional phase pre-integration optical multilevel transmission system using direct detection.
Figure 5:
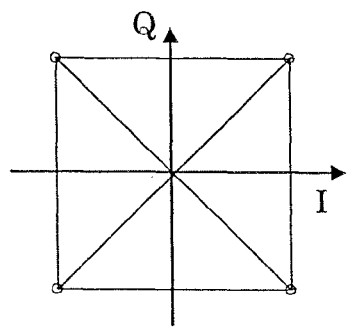
FIG. 5 is an illustrative view of the problem to be solved by this embodiment, which illustrates an appearance of the equalization of the modulation distortion in a conventional direct detection optical multilevel transmission system.
Figure 5:
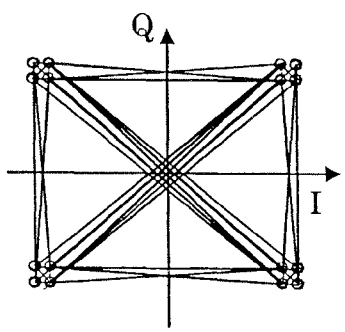
Figure 5:
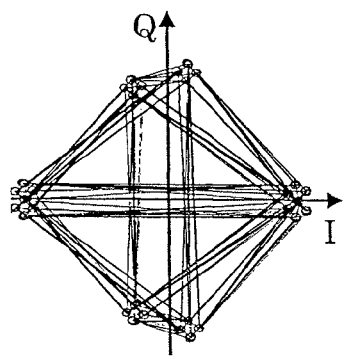
Figure 5:
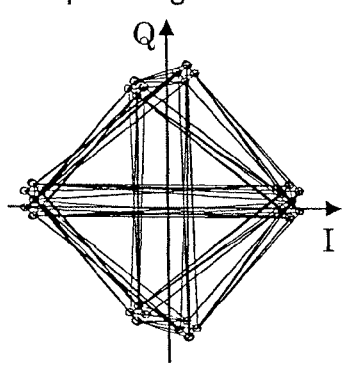
Figure 5:
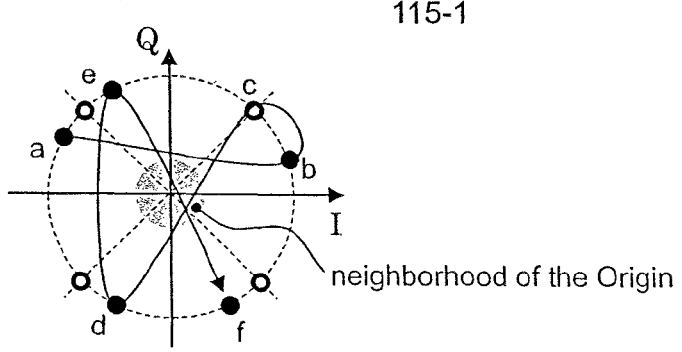

In an optical amplitude and phase multilevel receiver 219 according to this embodiment in FIG. 9, the differential phase component $\Delta\phi(n)$ and the amplitude component r(n) are detected as with the above-mentioned incoherent optical multilevel receiver 130 using the direct detection in FIG. 4. The differential phase component $\Delta\phi(n)$ and the amplitude component r(n) are input to the phase adaptive equalizer circuit 205 of this embodiment and an amplitude adaptive equalizer circuit 214 of this embodiment, and subjected to the adaptive equalization, respectively, and the modulation distortion is removed from each of those components. Because this example is the multilevel transmission for modulating the amplitude and the phase of the multilevel signal, independently, the differential phase component and the amplitude component, which have been adaptively equalized, are input to the phase multilevel signal decision circuit 215 and an amplitude multilevel signal decision circuit 216, respectively, to decode the multilevel signals.

In this example, the amplitude adaptive equalizer circuit 214 is disposed immediately after the square root circuit 138 This configuration is effective in removal of the modulation distortion in an example (for example, configuration of FIG. 9) in which the optical modulation is conducted so that the optical amplitude becomes linear on the transmitter side. In a configuration where the amplitude of the high-frequency signal is proportional to the intensity of the output optical signal as with the intensity modulation of a semiconductor laser, it is effective to insert the adaptive equalizer circuit immediately before the square root circuit 138. Also, the number of adaptive equalizer circuits is not limited to one. In the configuration of FIG. 9, if another adaptive equalizer circuit is arranged immediately before the square root circuit 138, the compensation effect such that the frequency characteristic of the optical intensity receiver 135 can be compensated is advantageously obtained.

The configuration of the optical amplitude modulator according to this embodiment is not limited to this example. If the optical modulator has a linear relationship between the applied voltage and the optical amplitude (or applied voltage and optical intensity), and the associated phase modulation is zero or sufficiently small, the modulation distortion can be equalized with high precision in the amplitude modulation component received by the configuration of FIG. 9. It is preferable that the phase modulation associated by the intensity modulation becomes zero as described above. However, when the optical amplitude modulator is used which causes the linear phase rotation with respect to the modulation voltage of the amplitude component (or intensity component), the associated phase modulation component can be also equalized by the provision of the adaptive equalization filter that compensates the phase component from the optical amplitude component r(n) (or an optical amplitude component P(n)) within the receiver. Thus, the high effect of equalizing the modulation distortion is obtained in this embodiment.

Also, in this embodiment, even if the optical amplitude modulator is not always linear characteristic with respect to the applied voltage, because the effect of equalizing the modulation distortion of the phase modulation component is obtained, independently, the optical amplitude modulator is available without any problem.

Third Embodiment

Figure 11:
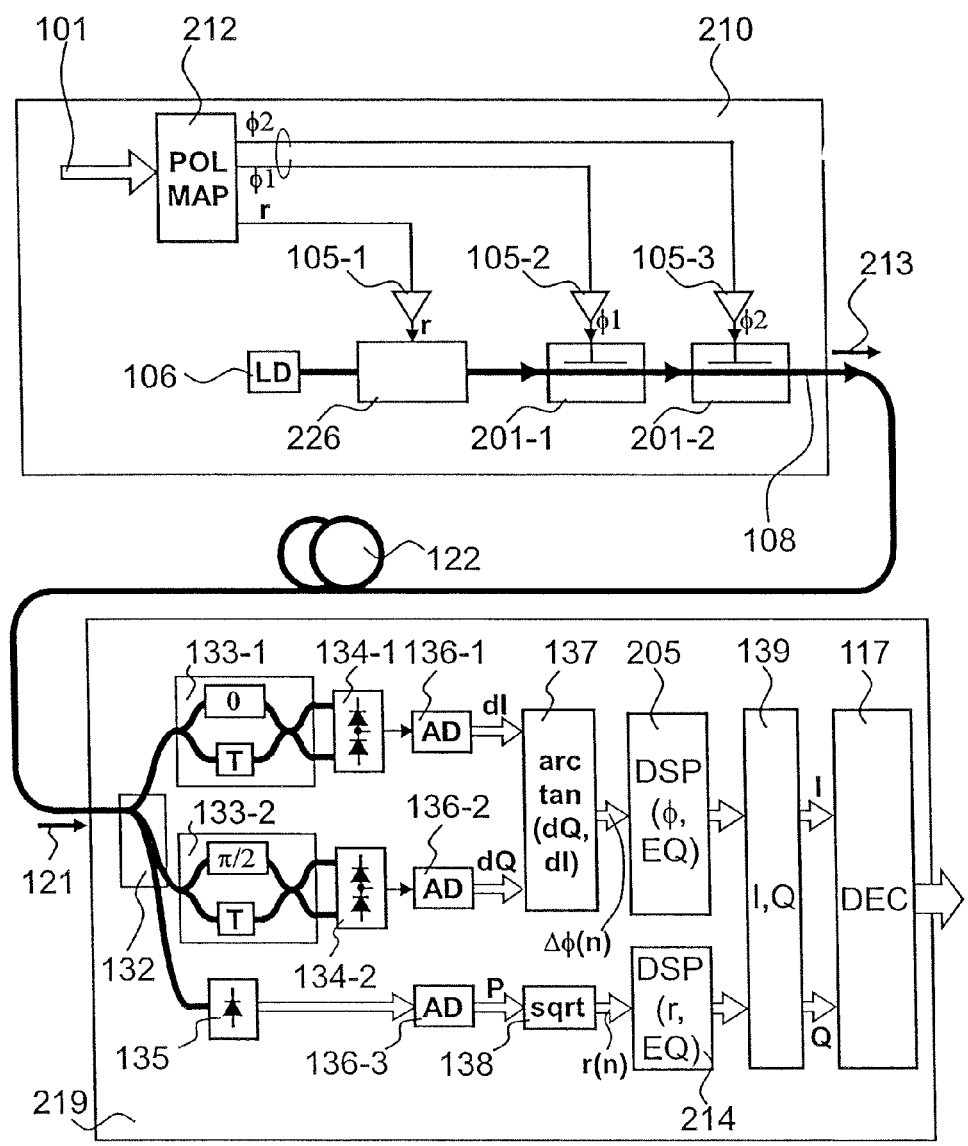
FIG. 11 is a configuration diagram of a direct detection optical multilevel transmission system using an optical multilevel amplitude and phase modulation according to a third embodiment of this embodiment.

FIG. 11 is a configuration diagram of a direct detection optical multilevel transmission system using the optical multilevel amplitude and phase modulation according to a third embodiment of this embodiment.

For example, significant features of the third embodiment reside in that coupled modulation of the amplitude and the phase is used, and multistage dependent modulation of the phase is used. Also, a configuration in which the multilevel modulation is generated by the combination of the high-speed binary signal is applied without using the DA converter. The multilevel amplitude and phase modulation available in this configuration is exemplified by an eight-level amplitude phase modulation (or 8-level QAM modulation), for example, in FIG. 12(B). The feature of the 8-level QAM modulation resides in that the modulations of the amplitude and the phase are not completely independent from each other, and a part thereof has a coupled relationship. This modulation signal can be generated by, for example, first generating binary amplitude and phase modulation in which both of the amplitude and the phase are changed as illustrated in FIG. 12(A), and further superimposing four-level phase modulation on the binary amplitude and phase modulation.

In the optical amplitude and phase multilevel transmitter 210 of FIG. 11, amplitude information r of one bit and phase information φ1 and φ2 of two bits are generated by the polar coordinate multilevel signal generator circuit 212. Those binary high-frequency electrical signals are amplified with desired amplitudes by driver circuits 105-1, 105-2, and 105-3, and then supplied to an optical amplitude phase modulator 226, a polar coordinate based optical phase modulator 201-1, and a polar coordinate based optical phase modulator 201-2, respectively.

Figure 12:
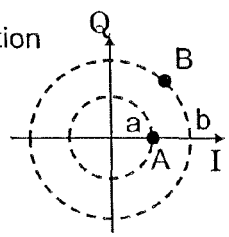
FIG. 12 is an illustrative view illustrating a modulation principle of an optical signal according to the third embodiment of this embodiment.
Figure 12:
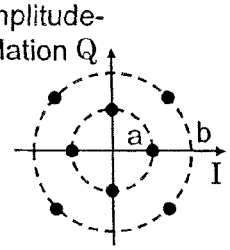
Figure 12:
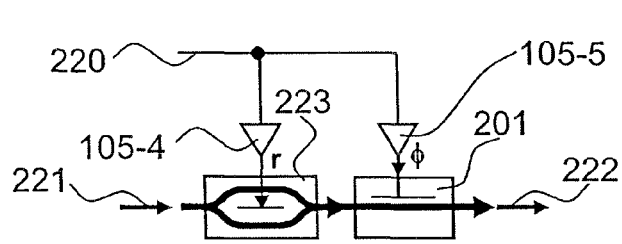
Figure 12:
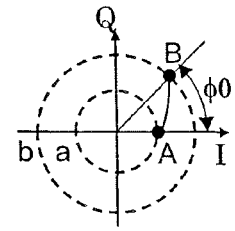
Figure 12:
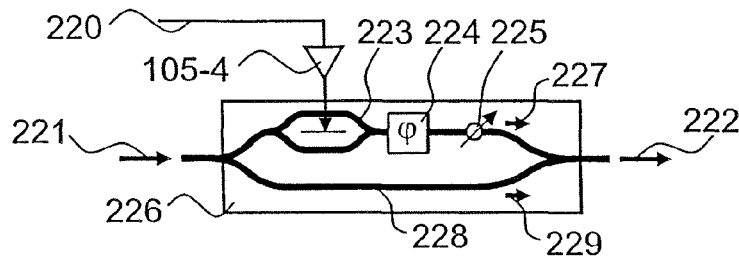
Figure 12:
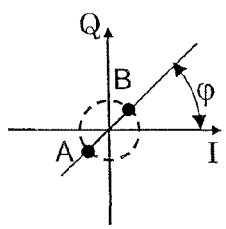
Figure 12:
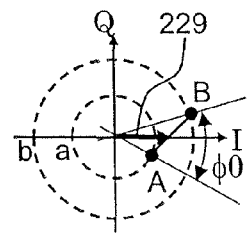

In the optical amplitude phase modulator 226, an input optical signal is subjected to binary amplitude and phase modulation illustrated in FIG. 12(A). Also, in the polar coordinate based optical phase modulator 201-1, the input optical signal is subjected to the binary phase modulation of a phase amplitude π, and in the polar coordinate based optical phase modulator 201-2, the input optical signal is subjected to the binary phase modulation of a phase amplitude π/2. As a result, the quaternary phase shift keying in which the two phase modulations different in the amplitude are added is superimposed on the binary amplitude and phase modulation of FIG. 12(A) so as to generate the eight-level amplitude and phase modulation of FIG. 12(B).

In a configuration where the phase modulators of this type (or amplitude and phase modulators) are connected in cascade, all of the phase modulation component and the phase modulation distortion, which are added by the respective modulators, are linearly added in the phase area. For that reason, the modulation distortion of the phase component can be adaptively equalized by the phase adaptive equalizer circuit 205 within the optical amplitude and phase multilevel receiver 219 of the embodiment. Because there is a need to receive the eight-level amplitude and phase modulation signal in the interior of the optical amplitude and phase multilevel receiver 219, the differential phase component $\Delta\phi(n)$ and the amplitude component r(n), which have been received and adaptively equalized, individually, are input to the Cartesian coordinate converter circuit 139, and subjected to the Cartesian coordinate conversion to synthesize the complex multilevel signal (I(n), Q(n)=r(n)exp(jΔφ(n)). This signal is influenced by the phase φ(n−1) of the previous symbol differently from the original optical multilevel signal r(n)exp(jφ(n)), and therefore the multilevel signal decision cannot be merely conducted. However, for example, the symbol decision can be conducted by a technique in which most-likelihood sequence estimation (MLSE) method is used in the interior of the phase multilevel signal decision circuit 117.

FIG. 12(C) illustrates a first configuration example of the optical amplitude phase modulator 226 used in this configuration.

An MZ optical modulator 223 and the polar coordinate based optical phase modulator 201 are connected in cascade. In this example, the input binary electrical signal is split into two signals, and those signals are amplified by driver circuits 105-4 and 105-5, and applied to the MZ optical modulator 223 and the polar coordinate based optical phase modulator 201. In this situation, if the amplitude of the output signal of the driver circuit is set so that the first MZ optical modulator 223 generates the binary amplitude modulation of the chirpless amplitude r=b−a (from amplitude value a to b), and simultaneously so that the second polar coordinate based optical phase modulator 201 generates the phase modulation of the amplitude φ0, a locus of the signal point is represented as illustrated in a right figure of FIG. 12(C), and a desired binary amplitude and phase modulation can be realized.

On the other hand, FIG. 12(D) illustrates a second configuration example of the optical amplitude phase modulator 226 used in this configuration.

In this example, an integration optical modulator with the MZ optical modulator 223 is used. A principle of this waveform generation technique is disclosed in Patent Literature 2: WO2008/026326 in detail.

In this example, an input optical signal 221 is split into two signals, and one signal is input to the MZ optical modulator 223 and the other signal is input to a wave guide 228. A binary electrical signal 220 is input to the MZ optical modulator 223 after having been amplified by the driver circuit 105-4. Unlike the other configuration examples, in this example, the binary electrical signal is supplied so that the extinction point of this MZ modulator comes to the amplitude center, and the output optical signal is subjected to the binary phase modulation. The binary phase modulation light signal is rotated by the phaser angle φ by an optical phase compensation area 224, and attenuated in amplitude by an optical attenuator 225. An output optical signal 227 of the MZ modulator is a binary phase modulation optical signal that is rotated by φ as represented in the signal constellation of FIG. 12(E), and interfered and synthesized with an output optical signal 229 in the wave guide, and converted into an output optical signal 222 at an outlet of the optical amplitude phase modulator 226. When it is assumed that the output optical signal 229 in the wave guide is indicated by 229 (horizontal arrow) in FIG. 12(F), if the output optical signal 229 is interfered and synthesized with the output optical signal 227 of the MZ modulator in FIG. 12(E), the output optical signal 222, which is a vector synthesis of those optical signals, is converted into two points A and B in FIG. 12(E). The signal constellation of those two points is equal to that in FIG. 12(A) except for the rotation in the phase direction, and the binary amplitude and phase modulation optical light can be generated even in this second configuration.

In this configuration, the electrical signal to be supplied to the MZ modulator is supplied so as to cross the extinction point, and the MZ modulator is used as a non-polar coordinate based phase modulator. However, in the synthesized output signal 227, as illustrated in FIG. 12(F), the phase transition between the two signal points A and B is linear, and can be regarded as the substantially linear phase rotation causing no phase discontinuity. Thus, even if the phase modulator of the MZ type inducing the phase discontinuity is used, when the phase modulator is used as the modulator causing no phase discontinuity as a whole by using the optical interference as in this example, the phase modulator can be regarded as the polar coordinate based phase modulator of this embodiment.

This configuration shows an example of generating the optical multilevel signal without using the optical DA converter. However, even if the DA converter is used in the driving of a part or all of the optical modulator, the DA converter is applied to this embodiment without any problem. As an example of this configuration, it is conceivable that the multilevel signal is generated by the DA converter, and a part of the optical modulator is driven by the multilevel signal.

In particular, in the generation of the multilevel signal on the transmitter side, when the DA converter is used, there is conceivable a method in which a digital signal processor circuit is also used on the transmitter side, and a part of the modulation distortion is preequalized. Even in this configuration, the remaining modulation distortion on the receiver side is equalized to obtain the higher-precision signal constellation. Therefore, the application of this embodiment is useful. Also, even in the case using no DA converter, the equivalent reduction in the modulation distortion can be conducted by the preenhancement of the driving signal or the compensation circuit of the transmitter bandwidth. Even in this case, this embodiment is further applicable.

Fourth Embodiment

Figure 13:
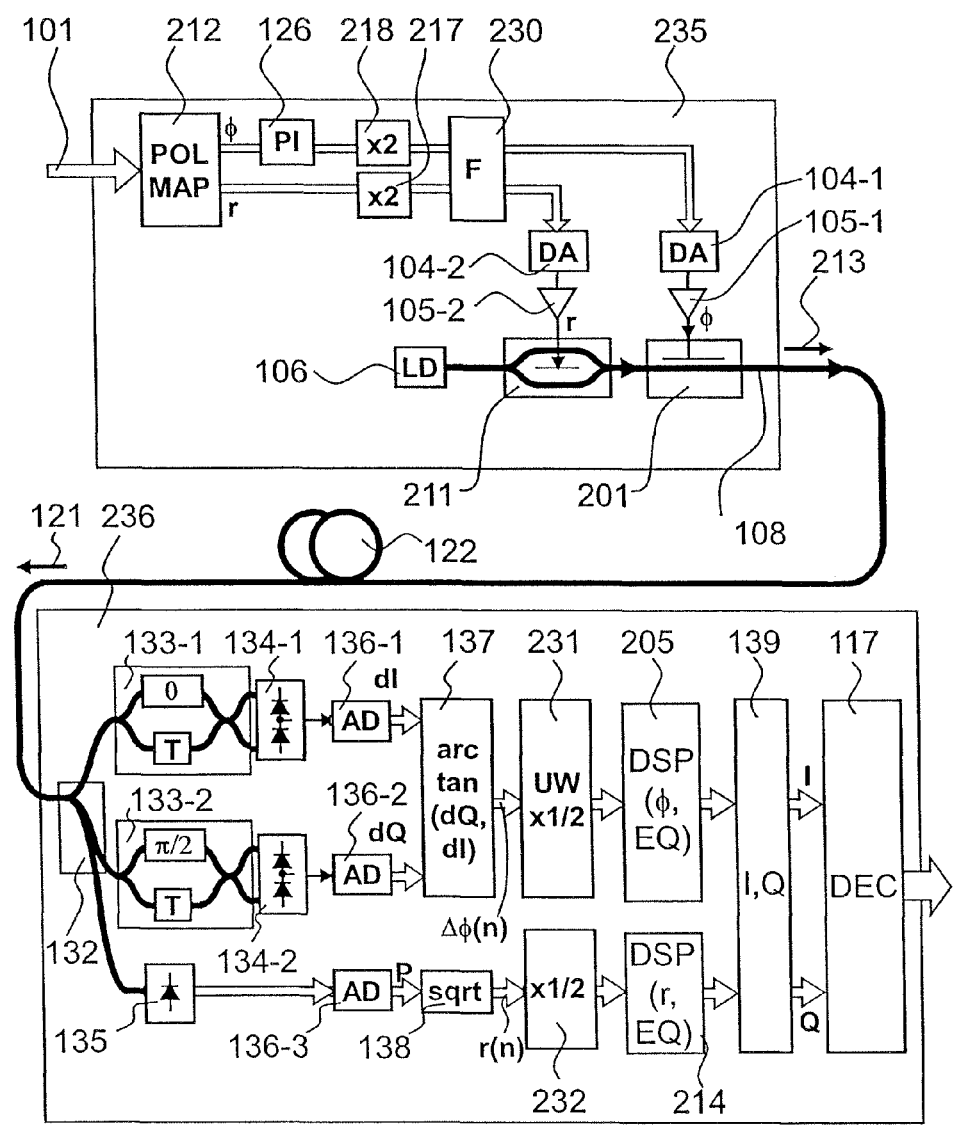
FIG. 13 is a configuration diagram of a direct detection optical multilevel transmission system using an optical QAM modulation according to a fourth embodiment of this embodiment.

FIG. 13 is a configuration diagram of a direct detection optical multilevel transmission system using the optical QAM modulation according to a fourth embodiment of the present invention.

In this example, features of the configuration reside in that, for example, a phase pre-integration circuit 126 is arranged to conduct an arbitrary multilevel modulation, a phase up-sampling circuit 218 is added to enhance the continuity of the phase rotation, a dispersion preequalizer circuit 230 is added, and a phase unwrapping/speed converter circuit 231 is arranged on the receiver side. Those respective functions do not need to be used at the same time, and several functions may be arbitrarily selected and installed as occasion demands.

Figure 1:
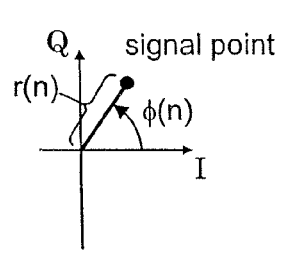
FIG. 1 is an illustrative view of a method of displaying an optical field signal, and signal points in a conventional optical multilevel modulation system.
Figure 1:
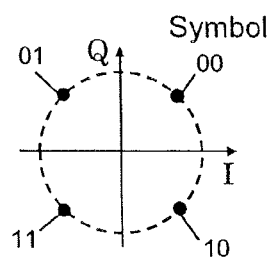
Figure 1:
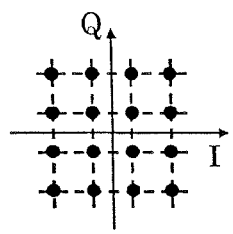
Figure 1:
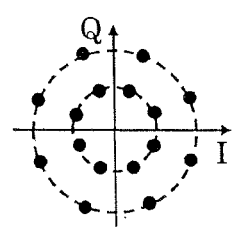
Figure 2:
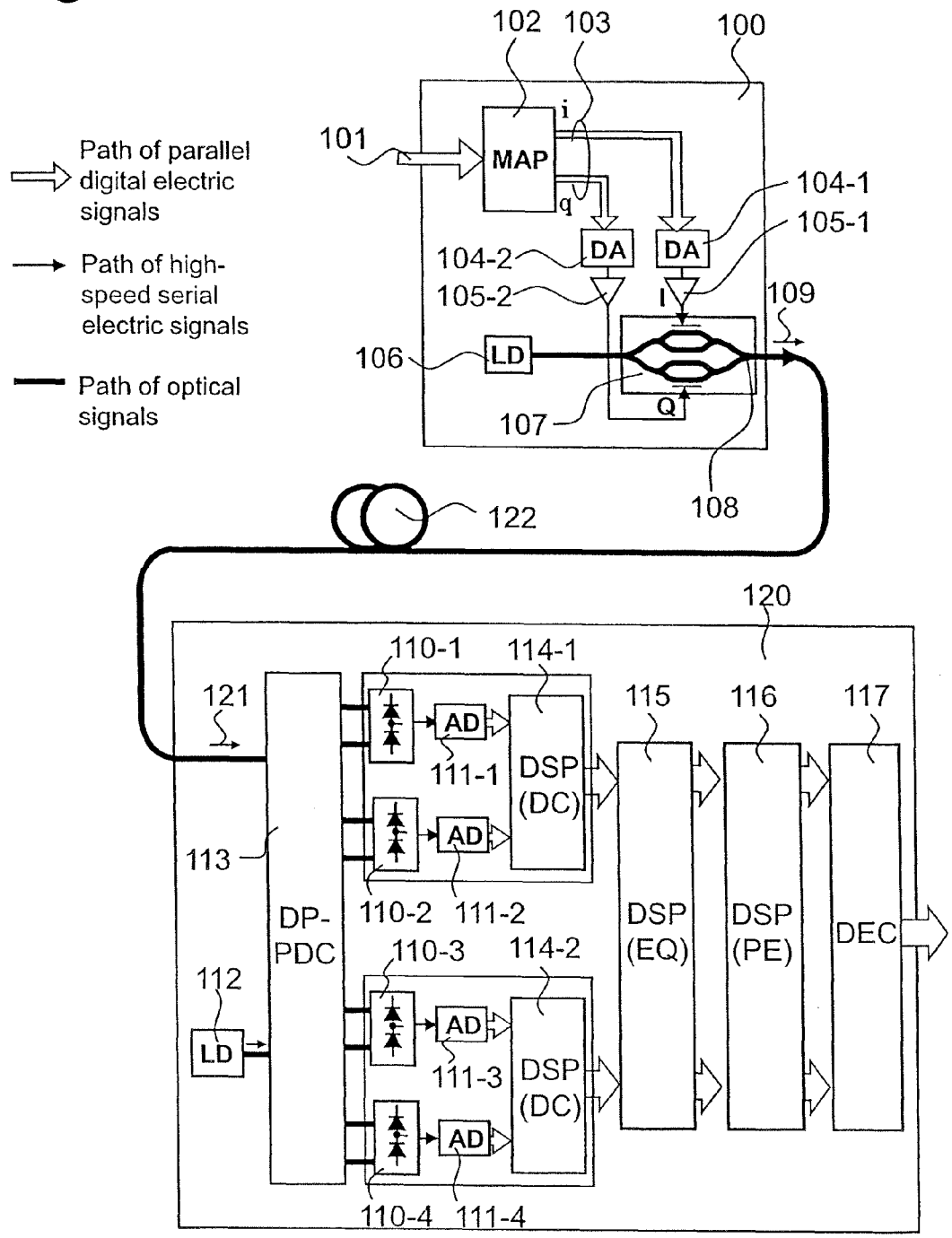
FIG. 2 is a configuration diagram of a conventional digital coherent optical multilevel transmission system.
Figure 3:
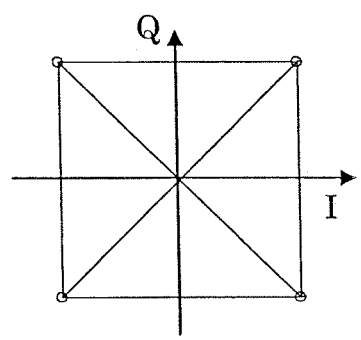
FIG. 3 is an illustrative view of an problem to be solved by this embodiment, which illustrates an appearance of equalization of modulation distortion in the conventional digital coherent optical multilevel transmission system.
Figure 3:
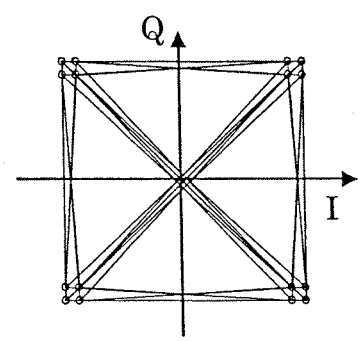
Figure 3:
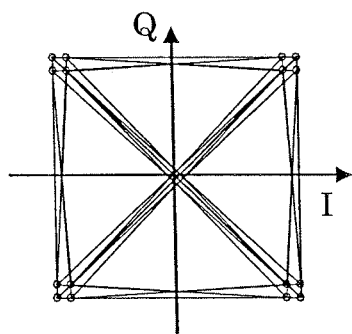
Figure 3:
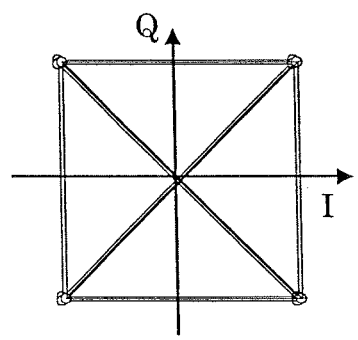

In an optical QAM signal transmitter 235 of FIG. 13, the complex QAM signals (for example, 16 QAM signals in FIG. 1(C)) are allocated to the input information signal in the polar coordinate multilevel signal generator circuit 212 to output the phase component $\phi$ and the amplitude component r. In those components, the phase component is input to the phase pre-integration circuit 126, and the phase component is integrated for each of the symbols. The phase pre-integration cancels the detection result of the differential phase on the receiver side as described in the conventional art of FIG. 4, and can transmit an arbitrary QAM signal.

Then, the amplitude information and the integrated phase information are input to an amplitude up-sampling circuit 217 of this embodiment and the phase up-sampling circuit 218 of this embodiment, up-sampled to a sampling speed which is about twice as high as the symbol speed, and subjected to signal point interpolation on the polar coordinates. The polar coordinate interpolation has an effect of preventing a detection error of the phase rotation on the receiver side.

Figure 14:
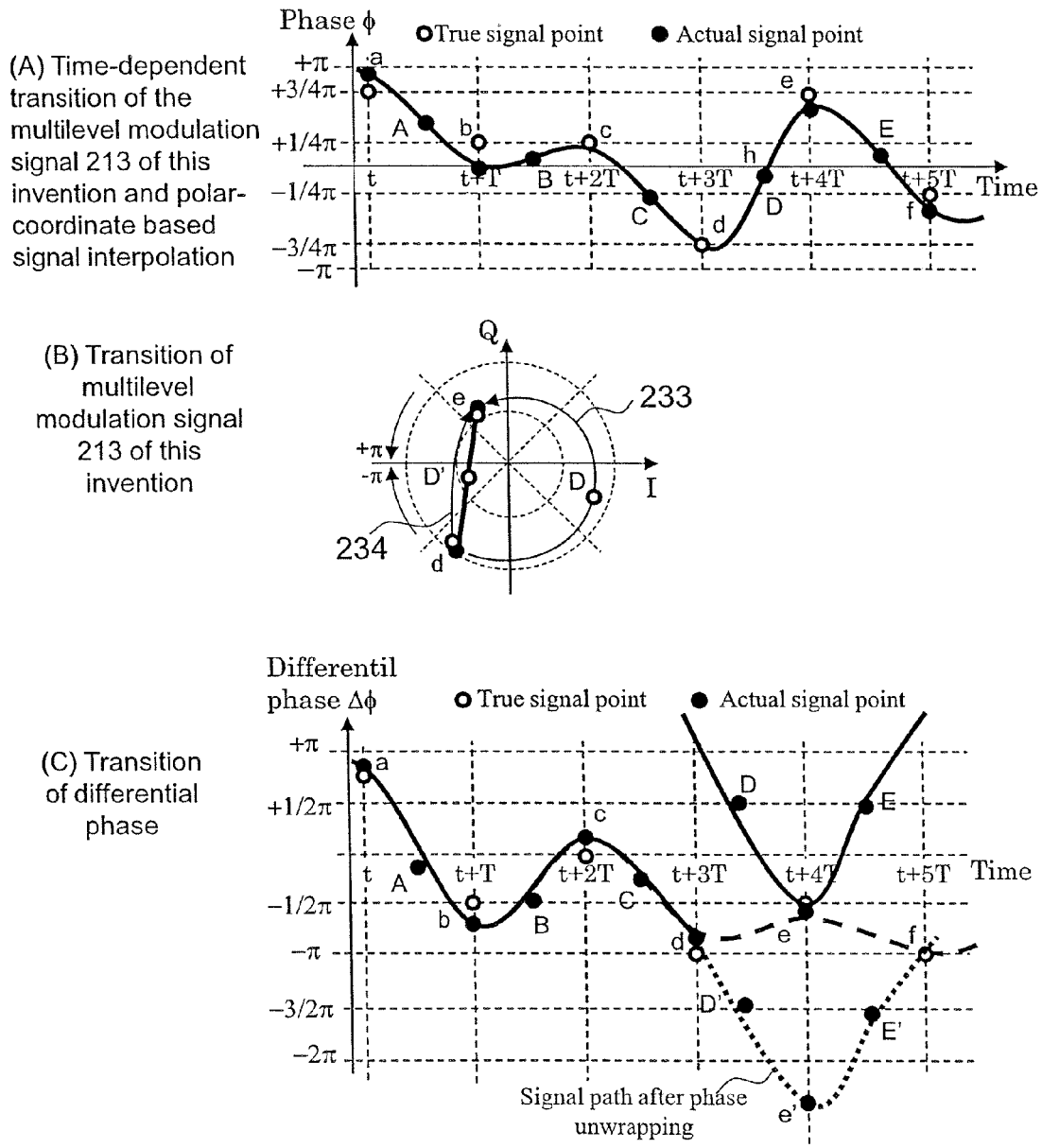
FIG. 14 is an illustrative view illustrating a transition state of an optical signal according to the fourth embodiment of this embodiment.

FIG. 14(A) is an illustrative view in the time waveform.

When the signal points a to f are center phaser angles of the respective multilevel symbol times t to t+5T, the up-sampled waveform is added with signal points A to F where the phase is interpolated on the polar coordinates at symbol boundary times. Although being not shown in this example, interpolation on the polar coordinate plane like interpolation is conducted even in the amplitude component. FIG. 14(B) illustrates transition to the signal points d to e on a two-dimensional complex plane, which is an example clarifying the effect of the interpolation. When the phaser angle of the signal points d to e exceeds $\pi$, if no interpolation is conducted, optionality remains in the transition route of the signal, thereby making it difficult to decide whether the transition route travels counterclockwise on the complex plane, or clockwise. In particular, when the interpolation of the signal points is conducted on the same Cartesian coordinates as those on which the multilevel QAM signal is generated, the interpolation point becomes a medium between the point d and the point e as indicated by D' in FIG. 14(B), an incorrect signal point transition 234 is formed, and the adaptive equalization on the receiver side does not normally operate. Under the circumstances, a point D interpolated on the polar coordinates is designated as an intermediate sample whereby a correct signal point transition 233 is ensured with the result that the adaptive equalization is correctly conducted on the receiver side.

In the above case, the up-sampling speed is just twice as high as the symbol speed, which is a number when the performance of the immediate wavelength dispersion pre-equalization is taken into account. The up-sampling speed is not always twice, and any value can be applicable if the value exceeds one amount in principle.

Subsequently, on the transmitter side, the up-sampled phase and amplitude information are input to the dispersion preequalizer circuit 230, and subjected to dispersion pre-equalization processing in which an influence of the chromatic dispersion in the optical fiber transmission channel 122 is canceled in advance. This can use the technique described in the conventional art of FIG. 4. As signal processing on the transmitter side which can be used concurrently in this embodiment, there is the compensation of the nonlinear effects of the transmission channel and the optical modulator. The digital signals that have been subjected to the chromatic dispersion preequalization are output by polar coordinate expressions of the amplitude and the phase, converted into the high-frequency electrical signals by the DA converters 104-1 and 104-2, and then amplified into desired amplitudes by the driver circuits 105-1 and 105-2, respectively. Thereafter, the digital signals are supplied to the optical amplitude modulator 211 and the polar coordinate based optical phase modulator 201, respectively. Even when the chromatic dispersion pre-equalization is conducted on the digital signals to output arbitrary optical field, this embodiment can be applied by the aid of the polar coordinate based arbitrary optical field modulator in which the optical amplitude modulator and the polar coordinate based optical phase modulator are connected in cascade.

As the arbitrary optical field modulator of the polar coordinates used in this embodiment, it is an indispensable condition that the optical amplitude modulator 211 does not induce the phase inversion. That is, when the MZ modulator is used for the optical amplitude modulator 211, it is necessary that the high-frequency electrical signal to be supplied does not cross the extinction point of the extinction characteristic that induces the inversion of the phase as described in FIG. 10. This configuration is largely different from the configuration of the conventional MZ optical amplitude modulator and the arbitrary field modulator using the MZ optical amplitude modulator.

As a specific example, one Mach-Zehnder modulator may be used as the polar coordinate based phase modulator. This configuration is disclosed in Patent Literature 3: U.S. Pat. No. 7,023,601 in detail.

Figure 15:
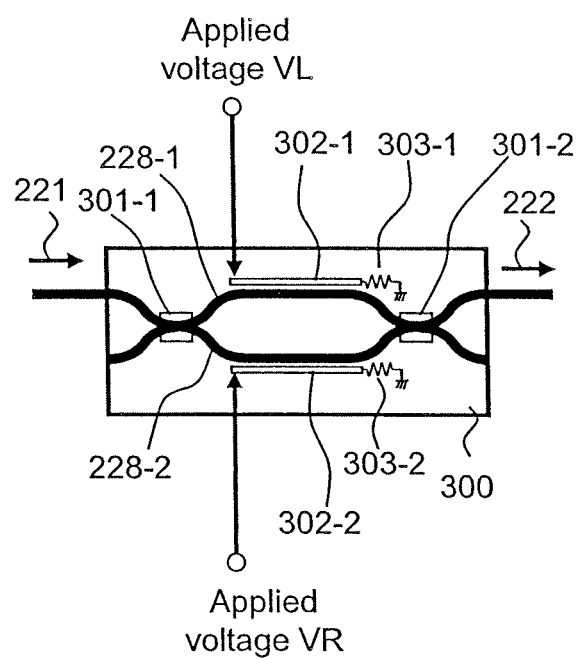
FIG. 15 is a configuration diagram of a two-electrode MZ optical modulator.

FIG. 15 illustrates a configuration diagram of a two-electrode MZ modulator 300. This modulator is widely used as an optical intensity modulator, and the input optical signal 221 is split into two optical wave guides 228-1 and 228-2 by an optical coupler 301-1, and thereafter again multiplexed by an optical coupler 301-2, and then output as the output optical signal 222. Modulation electrodes 302-1 and 302-2 are arranged in the respective optical wave guides, and their respective terminals are connected to terminating resistors 302-1 and 303-2. In this example, it is assumed that applied voltages to the respective modulation electrodes 302-1 and 302-2 are VL and VR.

In the configuration of this modulator, a mean value of the voltages VL(t) and VR(t) to be applied to the two electrodes is a phase modulation amount, and a difference therebetween is an amplitude modulation amount. In this situation, if the voltage difference VL(t)−VR(t) is set so as not to cross a point at which the output amplitude becomes substantially zero, this modulator satisfies the above amplitude condition, and can be applied to this embodiment. When the MZ optical modulator is used, the phase modulation component and the amplitude modulation component are supplied to the two electrodes after having been added and subtracted. Therefore, there is a case in which the modulation distortion occurs due to an interference between both of the voltages. Even in such a case, in this embodiment, with the use of the butterfly adaptive equalization filter that cancels an inter-code interference between the amplitude component and the phase component in the interior of the receiver, the modulation distortion can be reduced and received.

In an optical QAM signal receiver 236 according to this embodiment illustrated in FIG. 13, the optical signal is detected in the same manner as that in the above-mentioned embodiment. A difference from the above-mentioned embodiment resides in that the sampling speeds of AD converters 136-1 and 1136-2 are set to be substantially twice as high as the symbol speed, and after the differential phase component φ(n) has been detected by the inverse tangential operation circuit 137, phase unwrapping processing and down-sampling processing to 1 sample/symbol at the sampling speed are conducted by the phase unwrapping/speed converter circuit 231.

Referring to FIG. 14(C), the unwrapping processing of the phase will be described.

The unwrapping processing of the phase represents a technique by which it is decided whether the amount of transition of the phase exceeds an output range (normally, +π to −π) of the inverse tangential operation circuit 137, or not, and if yes, the range of the output signal is expanded to keep the continuity of the phase of the output signal. For example, it is assumed that the output signal of the inverse tangential operation circuit 137, which has been observed at a signal point d in FIG. 14(C), that is, the differential phase Δφ=−0.9π, the differential phase Δφ=−0.6π at a signal point e, and the differential phase Δφ=−π at a signal point f, are provided. If the sampling speed is 1 sample/symbol, it can be interpreted that the phase change occurs so that a to f are smoothly connected as indicated by a broken line. On the contrary, A to F are the signal points on the symbol boundary which have been observed by conducting sampling at a double speed by the DA converter. In this case, if the phase at the point D is +0.57π, and the phase at the point E is +0.45π, the phase rotating amount becomes −π or lower during the transition from the point d to the point D, and phase jump to +π occurs. A route that passes through three points of D, e, and E as indicated by a solid line in the figure, and allows the phase jump from +π to −π to occur, becomes a correct phase transition. When the adaptive equalization processing is conducted while the above phase discontinuity is occurring, the equalization processing becomes incomplete, and the modulation distortion cannot be completely removed.

In the phase unwrapping processing, the phase of the signal point is shifted by 2π for connection so that the phase change between the respective signal points becomes, for example, π or lower so that the phase discontinuity is prevented from occurring. In this example, signal points D', e', and E', which are displaced from the positions of the signal points D, e, and E toward a negative side by 2π, are set, and a dotted route (unwrapped route) connecting D', e', E', and f in the order starting from the point d is taken, the phase change amount between the respective signal points can be set to be π or lower. When the above unwrapping processing is conducted, the adaptive equalization of the phase component can be correctly executed, and the effects of this embodiment can be exerted. This unwrapping processing is conducted by the phase unwrapping/speed converter circuit 231.

In this example, an output signal P of the optical intensity receiver 135 is subjected to sampling at a speed that is substantially twice as high as the symbol speed by an AD converter 136-3, then input to the square root circuit 138, and again converted into one sample/symbol by a speed converter circuit 232. The amplitude component does not require the unwrapping processing unlike the phase, and therefore this configuration is not always required. However, if this configuration is applied, there are effects of adjusting the phase component and the processing timing, and improving the calculation precision of the amplitude.

Advantages of Respective Embodiments

According to the above-mentioned respective embodiments, even in the optical multilevel transmission system using the direct detection (or incoherent detection), the polar coordinate based phase modulation on the transmitter side and the detection of the differential phase on the receiver side have a linear relationship, resulting in such an advantage that the modulation distortion can be removed by using the adaptive equalization filter in the phase area.

Also, even when the optical signal is subjected to the amplitude modulation, the phase and the amplitude are modulated by independent modulators on the transmitter side. Also, the differential phase and the amplitude component are detected and adaptively equalized even on the receiver side, independently, resulting in such an advantage that both of those modulation distortions can be equalized, independently.

Also, in this situation, if a part of the above optical amplitude modulation component is coupled with a part of the optical phase modulation component, and modulated with the same information signal, more complicated multilevel modulation such as the QAM modulation can be simply generated, and the present invention can be applied to this configuration.

As described above, when the Mach-Zehnder type optical modulator is used for the optical amplitude modulator, if the signal is modulated in the biased state so as not to cross the extinction point, the phase jump does not occur during the amplitude modulation. As a result, the compensation of the modulation distortion according to the present invention can be effectively implemented.

Also, the above phase modulator and the above amplitude modulator are each replaced with the modulator of the two-electrode Mach-Zehnder type, thereby making it possible to reduce the costs and the size.

Also, the present invention has such advantages that the optical multilevel signal can be generated even if the optical amplitude modulators or the phase modulators are connected in cascade, and the complicated multilevel signal can be generated even if no DA converter is used.

Further, the DA converter interpolates the signal points so that the phases of the generated signals are continuous for modulation, resulting in such an advantage that the phase uncertainty of the modulation signal is decreased to improve the effect of the adaptive equalization within the receiver.

Further, the sampling speed of the AD converter is set to be higher than one sampling/symbol, and the unwrapping processing of the phase is conducted whereby the discontinuity of the phase rotation can be compensated. As a result, the applied range or effects of the present invention can be further remarkably enhanced.

INDUSTRIAL APPLICABILITY

This embodiments can be applied to, for example, the incoherent optical fiber transmission of the optical multilevel signal in the optical communication field, in particular, the optical multilevel signal with high transmission efficiency, whose optical phase, or amplitude and phase are modulated. Also, the present invention can be applied to the optical multilevel transmitter and the optical multilevel receiver as well as the optical multilevel transmission system, which are used for optical fiber transmission.

EXPRESSION OF REFERENCE LETTERS

100: optical multilevel transmitter
101: digital information input terminal (m bits)
102: complex multilevel signal generator circuit
103: complex multilevel information signal
104: DA converter
105: driver circuit
106: laser source
107: quadrature optical field modulator
108: output optical fiber
109: output optical signal
110: balanced optical detector
111: AD converter
112: local laser source
113: polarization-diversity optical 90-deg. hybrid circuit
114: chromatic dispersion compensator circuit
115: adaptive equalizer circuit
116: phase estimation circuit
117: multilevel signal decision circuit
120: digital coherent optical receiver
121: input optical signal
122: optical fiber transmission channel
123: phase pre-integration type optical multilevel transmitter
124: complex up-sampling circuit
125: preequalizer circuit
126: phase pre-integration circuit
130: incoherent optical receiver
132: optical splitter
133: optical delay detector
134: balanced optical receiver
135: optical intensity receiver
136: AD converter
137: inverse tangential operation circuit
138: square root circuit
139: Cartesian coordinate converter circuit
200: optical phase multilevel transmitter according to this embodiment
201: polar coordinate based optical phase modulator
202: phase multilevel signal generator circuit
203: optical phase modulation signal according to this embodiment
204: optical phase multilevel receiver according to this embodiment
205: phase adaptive equalizer circuit according to this embodiment
210: optical amplitude and phase multilevel transmitter according to this embodiment
211: optical amplitude modulator
212: polar coordinate multilevel signal generator circuit
213: optical amplitude and phase modulation signal according to this embodiment
214: amplitude adaptive equalizer circuit according to this embodiment
215: phase multilevel signal decision circuit
216: amplitude multilevel signal decision circuit
217: amplitude up-sampling circuit according to this embodiment
218: phase up-sampling circuit according to this embodiment
219: optical amplitude and phase multilevel receiver according to this embodiment
220: binary electrical signal
221: input optical signal
222: output optical signal
223: MZ optical modulator
224: optical phase compensation area
225: optical attenuator
226: optical amplitude phase modulator
227: output optical signal of MZ part
228: wave guide
229: output optical signal of wave guide
230: dispersion preequalizer circuit
231: phase unwrapping/speed converter circuit
232: speed converter circuit
233: correct signal point transition
234: incorrect signal point transition
235: optical QAM signal transmitter according to this embodiment
236: optical QAM signal receiver according to this embodiment
300: two-electrode MZ modulator
301: optical coupler
302: modulation electrode
303: terminating resistor

The invention claimed is:

1. An optical transmission system, comprising:
an optical transmitter including a polar coordinate based optical phase modulator that modulates a phase of an optical signal into a phase rotation direction; and
an optical receiver including a coupled two-dimensional optical delay detection receiver, at least two AD converters, a differential phase calculation circuit, and a digital adaptive equalizer that linearly equalizes a differential phase component obtained from the differential phase calculation circuit in a phase area,
wherein binary or more level of optical phase multilevel modulation signal, which is transmitted from the optical transmitter, is received by the optical receiver, and
two output signals of the coupled two-dimensional optical delay detection receiver are converted into respective high-speed digital signals by the AD converters and input to the differential phase calculation circuit, and the differential phase component calculated by the differential phase calculation circuit is adaptively equalized by the digital adaptive equalizer, and thereafter decision processing of the multilevel signal is conducted.

2. The optical transmission system according to claim 1,
wherein the optical transmitter includes an optical amplitude modulator that induces no phase inversion of the optical signal,
the optical receiver includes an optical intensity detector,
an optical multilevel modulation signal in which both of a phase and an amplitude of the optical signal have been modulated is transmitted from the optical transmitter, and
the differential phase component obtained by the optical receiver, and an optical intensity modulation component obtained from the optical intensity detector or an optical amplitude modulation component that is a square root of the optical intensity modulation component are subjected to the decision processing of the multilevel signal.

3. The optical transmission system according to claim 2,
wherein optical amplitude modulation in the optical transmitter is coupled with optical phase modulation, and the modulations are performed with the same information signal.

4. The optical transmission system according to claim 2,
wherein the optical amplitude modulator is a Mach-Zehnder type optical modulator, and
the signal is modulated in a state where the modulation signal to be supplied to a modulation electrode of the Mach-Zehnder type optical modulator is biased so as not to cross an extinction point that is a minimum point of an optical transmission characteristic.

5. The optical transmission system according to claim 2,
wherein the optical phase modulator and the optical amplitude modulator are realized by a two-electrode Mach-Zehnder type optical modulator, and
a sum of voltages to be applied to two electrodes is a phase modulation component, a difference between the voltages to be applied to the two electrodes is an amplitude modulation component, and the difference between the voltages to be applied does not cross an extinction point of the Mach-Zehnder type optical amplitude modulator to conduct the modulation.

6. The optical transmission system according to claim 1,
wherein the optical phase modulator includes a plurality of polar coordinate based optical phase modulators for modulating the phase of the optical signal into the phase rotation direction, which are connected in cascade.

7. The optical transmission system according to claim 2,
wherein the optical amplitude modulator is an optical amplitude phase modulator in which the optical amplitude modulator that induces no phase inversion, and a second polar coordinate based optical phase modulator that modulates the phase of the optical signal into a phase rotation direction are connected in cascade.

8. The optical transmission system according to claim 2,
wherein the optical phase modulator and the optical amplitude modulator include the optical amplitude modulator that induces no phase inversion, and a plurality of the polar coordinate based optical phase modulators that modulate the phase of the optical signal into the phase rotation direction, which are connected in cascade.

9. The optical transmission system according to claim 1,
wherein the phase modulation signal of the optical phase modulator is a high-speed analog signal generated by a DA converter whose sampling speed is larger than 1 sample per symbol, and
the signal is modulated by interpolating a phase and an amplitude of signal points so that the phases of generated signal are continuous even if a phase modulation range exceeds $\pi$.

10. The optical transmission system according to claim 1,
wherein unwrapping processing of the phase is conducted so that the sampling speed of the AD converter arranged in the optical receiver is larger than 1 sample per symbol, and a range of the calculated differential phase component is continuous even if the range exceeds $\pm\pi$, or 0 to $2\pi$.

* * * * *